US012648004B2

(12) United States Patent
Sarkis et al.

(10) Patent No.: US 12,648,004 B2
(45) Date of Patent: Jun. 2, 2026

(54) TECHNIQUES FOR SIDELINK COMMUNICATIONS USING A SIDELINK RESOURCE POOL CONFIGURED FOR A DIFFERENT RADIO ACCESS TECHNOLOGY

(71) Applicant: QUALCOMM INCORPORATED, San Diego, CA (US)

(72) Inventors: Gabi Sarkis, San Diego, CA (US); Stelios Stefanatos, San Diego, CA (US); Kapil Gulati, Belle Mead, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 459 days.

(21) Appl. No.: 18/002,207

(22) PCT Filed: Aug. 16, 2021

(86) PCT No.: PCT/US2021/046127
§ 371 (c)(1),
(2) Date: Dec. 16, 2022

(87) PCT Pub. No.: WO2022/040078

PCT Pub. Date: Feb. 24, 2022

(65) Prior Publication Data

US 2023/0224926 A1      Jul. 13, 2023

(30) Foreign Application Priority Data

Aug. 17, 2020      (GR) .............................. 20200100482

(51) Int. Cl.
H04W 72/25      (2023.01)
H04W 4/40      (2018.01)
(Continued)

(52) U.S. Cl.
CPC ............. *H04W 72/25* (2023.01); *H04W 4/40* (2018.02); *H04W 72/044* (2013.01); *H04W 72/11* (2023.01); *H04W 80/02* (2013.01)

(58) Field of Classification Search
CPC ..... H04W 72/044; H04W 4/40; H04W 80/02; H04W 72/25; H04L 5/0005
See application file for complete search history.

(56) References Cited

U.S. PATENT DOCUMENTS 10,645,748 B2      5/2020  Agarwal et al.
11,405,932 B2 *    8/2022  Cheng ................. H04W 52/367
(Continued)

FOREIGN PATENT DOCUMENTS

WO      WO-2018175010        9/2018
WO      WO-2019061180 A1     4/2019
WO      WO-2020029875 A1     2/2020

OTHER PUBLICATIONS

Huawei, et al., "Remaining Details of in-Device Coexistence Between LTE and NR Sidelinks", 3GPP Draft, 3GPP TSG RAN WG1 Meeting #102-e, R1-2005800, 3rd Generation Partnership Project (3GPP), Mobile Competence Centre, 650, Route Des Lucioles, F-06921 Sophia-Antipolis Cedex, France, vol. RAN WG1, No. E-Meeting, Aug. 17, 2020-Aug. 28, 2020, Aug. 8, 2020 (Aug. 8, 2020), XP051917727, 3 Pages, p. 1, Paragraph 2.1-p. 2 Figures 1, 2.

(Continued)

*Primary Examiner* — Raj Jain
(74) *Attorney, Agent, or Firm* — Holland & Hart LLP/Qualcomm Incorporated

(57)      ABSTRACT

Methods, systems, and devices for wireless communications are described. A transmitting device and a receiving device may communicate sidelink messages of a second radio access technology (RAT) using a sidelink resource pool signaled using a first RAT. For example, the receiving UE (Continued)

may receive a sidelink control channel associated with the first RAT (e.g., Long Term Evolution (LTE)), may determine a set of time and frequency resources indicated by the sidelink control channel, and then may monitor the set of time and frequency resources to receive a sidelink message associated with the second RAT (e.g., New Radio (NR)). In some implementations, the set of time and frequency resource may be indicated that they may be used for the second RAT via a field in the sidelink control channel or via an additional sidelink message associated with the second RAT transmitted with the sidelink control channel.

26 Claims, 16 Drawing Sheets

(51) Int. Cl.
| | |
|---|---|
| *H04W 72/044* | (2023.01) |
| *H04W 72/11* | (2023.01) |
| *H04W 80/02* | (2009.01) |

(56) References Cited

U.S. PATENT DOCUMENTS

| | | | | |
|---|---|---|---|---|
| 2019/0044779 | A1 | 2/2019 | Wu et al. | |
| 2019/0230485 | A1* | 7/2019 | Hahn | H04W 80/02 |
| 2019/0274121 | A1 | 9/2019 | Wu et al. | |
| 2020/0314796 | A1* | 10/2020 | Lee | H04W 68/02 |
| 2020/0382354 | A1* | 12/2020 | Sengupta | H04L 5/001 |
| 2021/0160037 | A1 | 5/2021 | Ji | |
| 2021/0345454 | A1* | 11/2021 | Dhanapal | H04W 76/27 |
| 2022/0201716 | A1* | 6/2022 | Yi | H04W 72/23 |
| 2023/0224926 | A1* | 7/2023 | Sarkis | H04W 72/11 |
| | | | | 370/329 |

OTHER PUBLICATIONS

International Search Report and Written Opinion—PCT/US2021/046127—ISA/EPO—Dec. 3, 2021.

* cited by examiner

Frequency

Time

300

Frequency

Time

301

Slot for First RAT
425

Frequency

Sidelink Control Channel for First RAT 405

Sidelink Control Channel for Second RAT 415

Sidelink Shared Channel for Second RAT 420

Resource Pool 410

Slot for Second RAT 430-a

Slot for Second RAT 430-b

Time

400

610

615

620

605

600

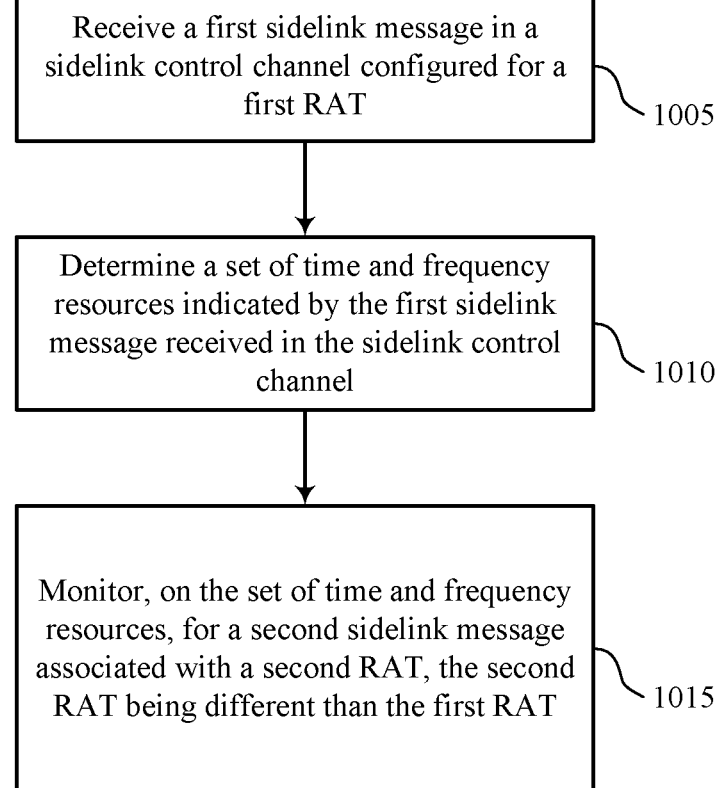

Receive a first sidelink message in a sidelink control channel configured for a first RAT

1005

Determine a set of time and frequency resources indicated by the first sidelink message received in the sidelink control channel

1010

Monitor, on the set of time and frequency resources, for a second sidelink message associated with a second RAT, the second RAT being different than the first RAT

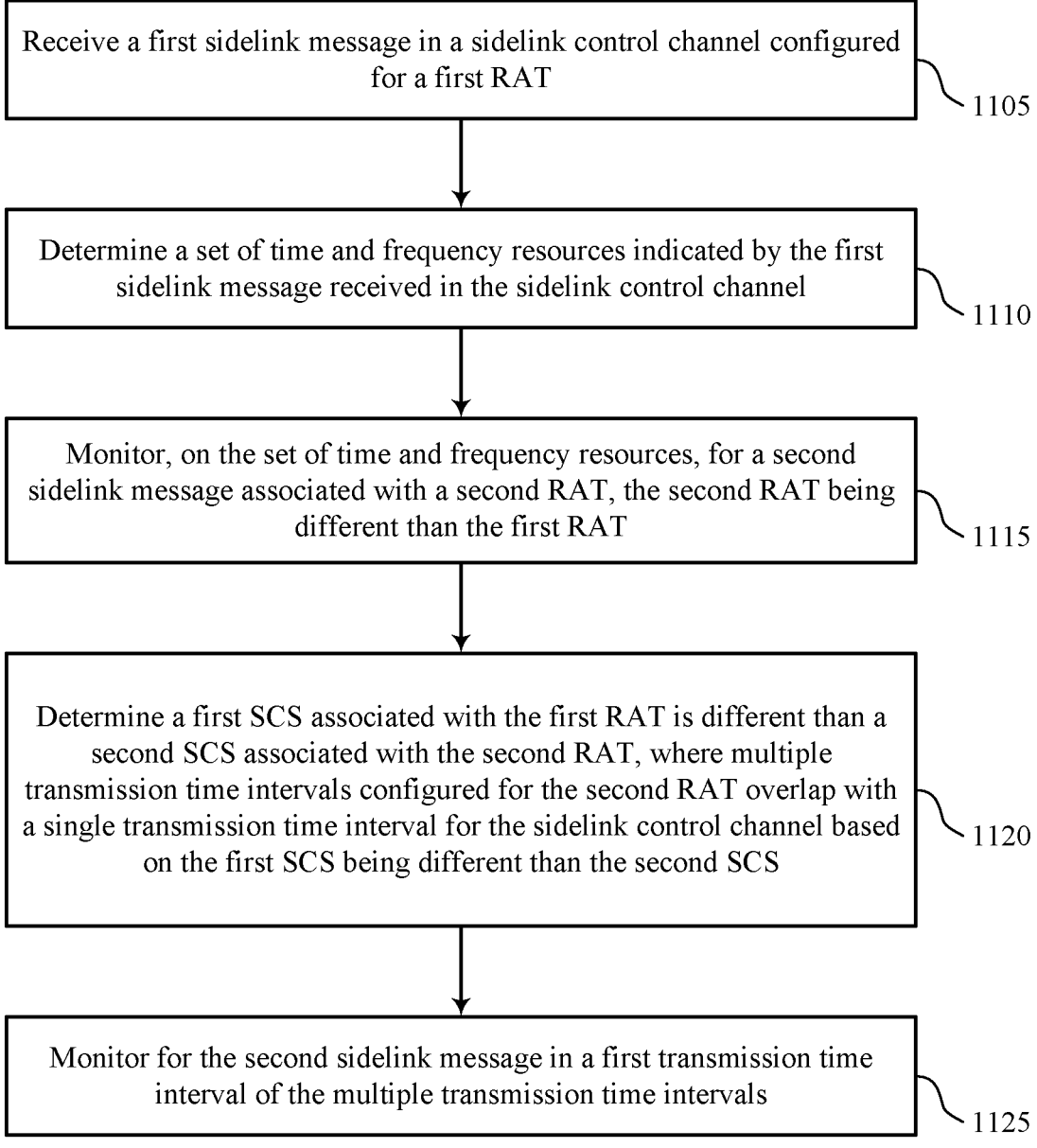

Receive a first sidelink message in a sidelink control channel configured for a first RAT

1105

Determine a set of time and frequency resources indicated by the first sidelink message received in the sidelink control channel

1110

Monitor, on the set of time and frequency resources, for a second sidelink message associated with a second RAT, the second RAT being different than the first RAT

1115

Determine a first SCS associated with the first RAT is different than a second SCS associated with the second RAT, where multiple transmission time intervals configured for the second RAT overlap with a single transmission time interval for the sidelink control channel based on the first SCS being different than the second SCS

1120

Monitor for the second sidelink message in a first transmission time interval of the multiple transmission time intervals

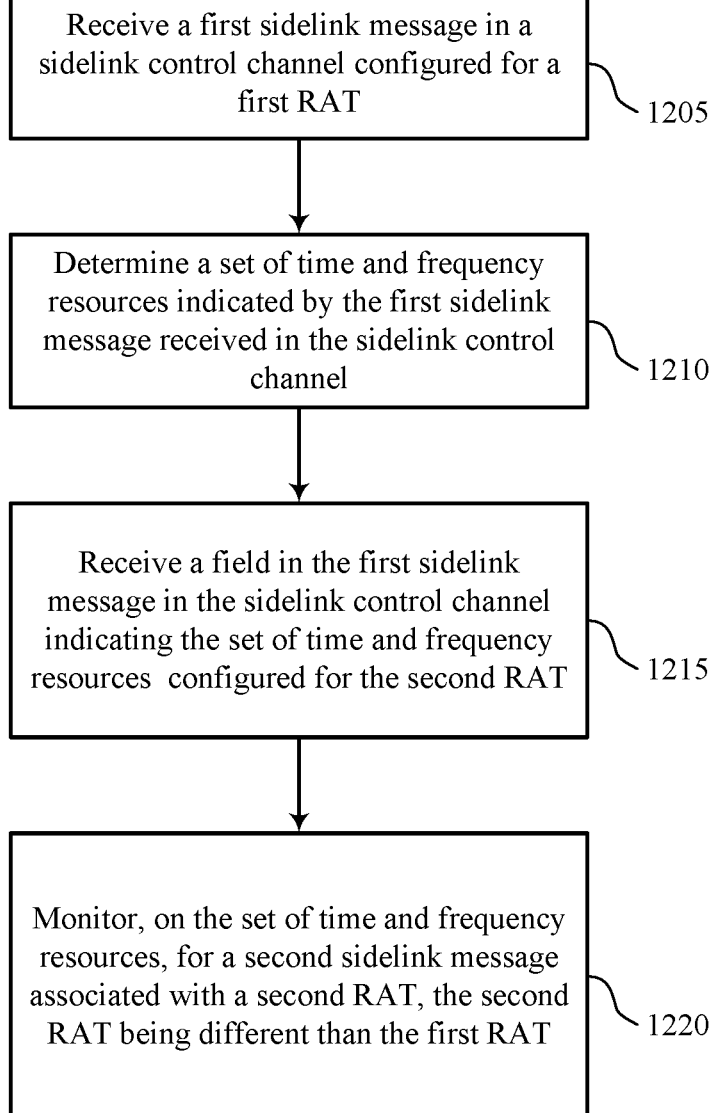

Receive a first sidelink message in a
sidelink control channel configured for a
first RAT
                                            1205

Determine a set of time and frequency
resources indicated by the first sidelink
message received in the sidelink control
channel
                                            1210

Receive a field in the first sidelink
message in the sidelink control channel
indicating the set of time and frequency
resources configured for the second RAT
                                            1215

Monitor, on the set of time and frequency
resources, for a second sidelink message
associated with a second RAT, the second
RAT being different than the first RAT
                                            1220

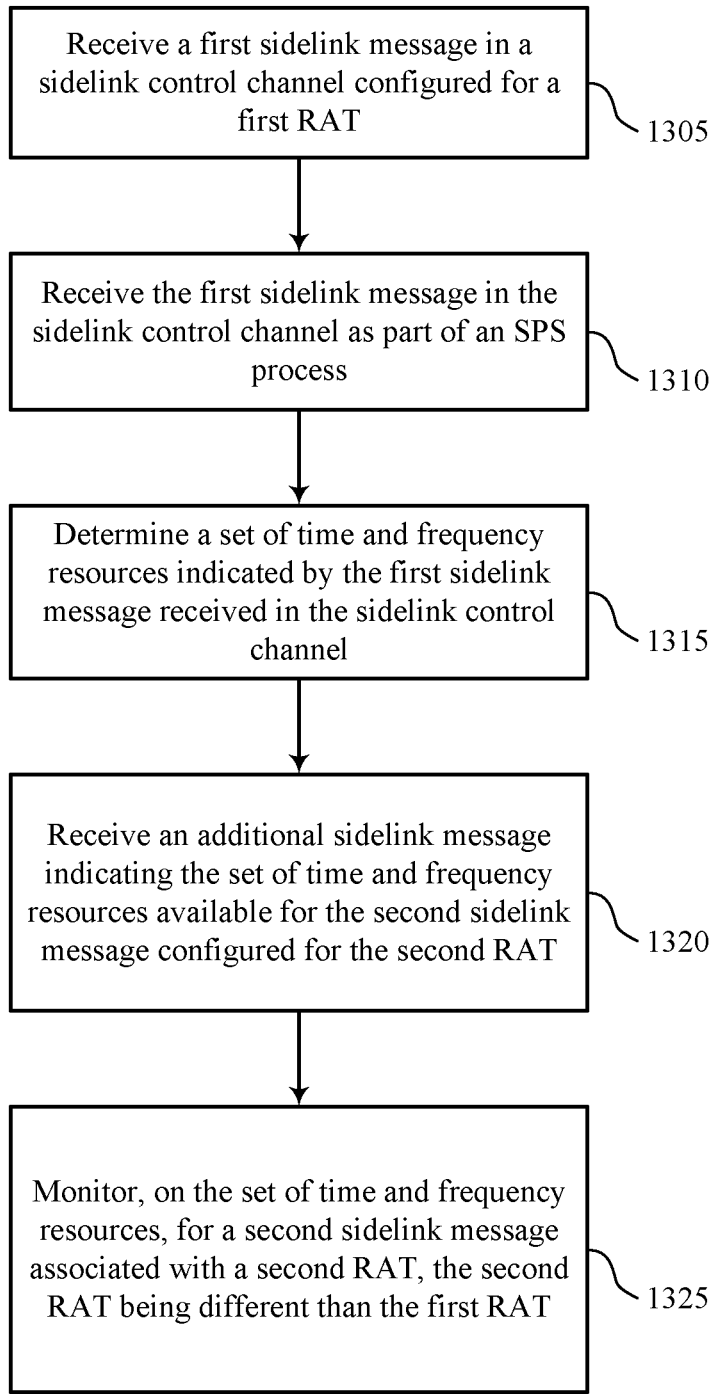

Receive a first sidelink message in a sidelink control channel configured for a first RAT ⟩ 1305

Receive the first sidelink message in the sidelink control channel as part of an SPS process ⟩ 1310

Determine a set of time and frequency resources indicated by the first sidelink message received in the sidelink control channel ⟩ 1315

Receive an additional sidelink message indicating the set of time and frequency resources available for the second sidelink message configured for the second RAT ⟩ 1320

Monitor, on the set of time and frequency resources, for a second sidelink message associated with a second RAT, the second RAT being different than the first RAT ⟩ 1325

Determine a sidelink control channel
configured for a first RAT

1405

Determine a set of time and frequency
resources indicated by a first sidelink
message in the sidelink control channel

1410

Transmit, on the set of time and frequency
resources, a second sidelink message
associated with a second RAT, the second
RAT being different than the first RAT

1415

1400

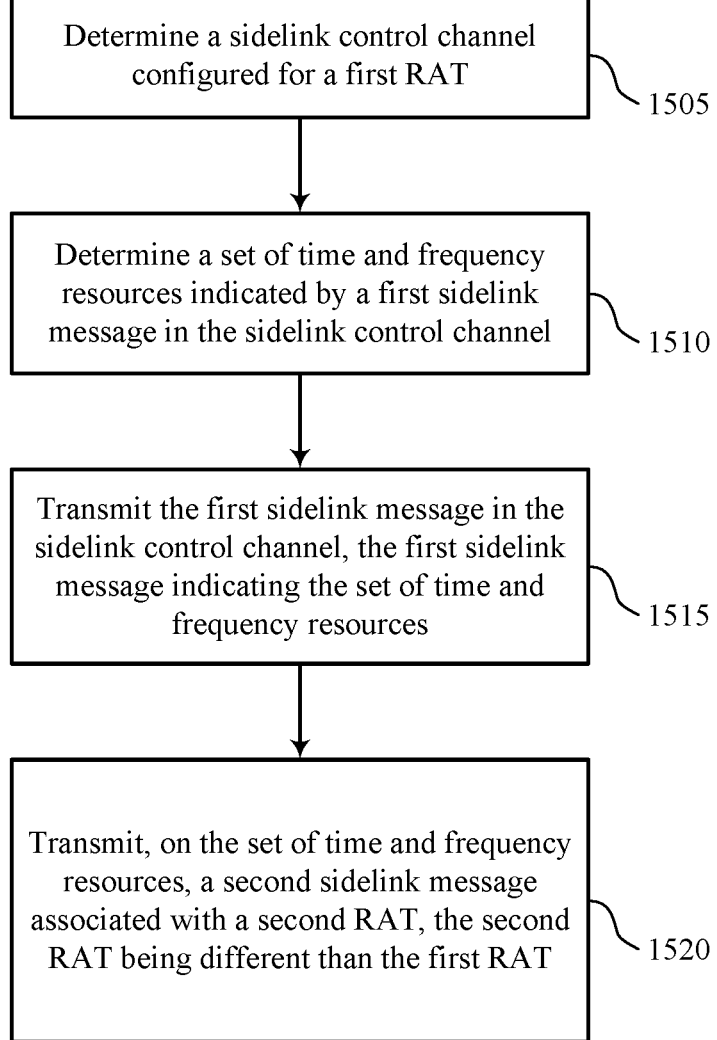

Determine a sidelink control channel configured for a first RAT

1505

Determine a set of time and frequency resources indicated by a first sidelink message in the sidelink control channel

1510

Transmit the first sidelink message in the sidelink control channel, the first sidelink message indicating the set of time and frequency resources

1515

Transmit, on the set of time and frequency resources, a second sidelink message associated with a second RAT, the second RAT being different than the first RAT

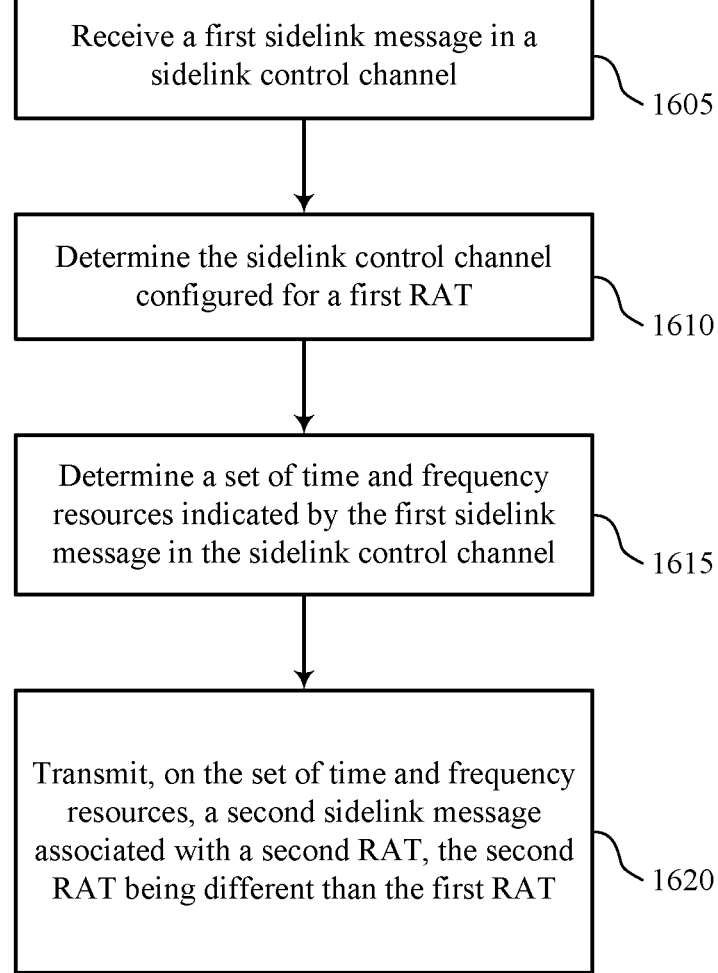

Receive a first sidelink message in a sidelink control channel

1605

Determine the sidelink control channel configured for a first RAT

1610

Determine a set of time and frequency resources indicated by the first sidelink message in the sidelink control channel

1615

Transmit, on the set of time and frequency resources, a second sidelink message associated with a second RAT, the second RAT being different than the first RAT

TECHNIQUES FOR SIDELINK COMMUNICATIONS USING A SIDELINK RESOURCE POOL CONFIGURED FOR A DIFFERENT RADIO ACCESS TECHNOLOGY

CROSS REFERENCES

The present Application is a 371 national stage filing of International PCT Application No. PCT/US2021/046127 by SARKIS et al. entitled "TECHNIQUES FOR SIDELINK COMMUNICATIONS USING A SIDELINK RESOURCE POOL CONFIGURED FOR A DIFFERENT RADIO ACCESS TECHNOLOGY," filed Aug. 16, 2021; and claims priority to Greek Patent Application No. 20200100482 by SARKIS et al. entitled "TECHNIQUES FOR SIDELINK COMMUNICATIONS USING A SIDELINK RESOURCE POOL CONFIGURED FOR A DIFFERENT RADIO ACCESS TECHNOLOGY," filed Aug. 17, 2020, each of which is assigned to the assignee hereof, and each of which is expressly incorporated by reference in its entirety herein.

FIELD OF TECHNOLOGY

The following relates generally to wireless communications and more specifically to sidelink communications using a sidelink resource pool configured for a different radio access technology (RAT).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications, a first UE may communicate with a second UE directly via sidelink communications. Efficient techniques are desired for supporting sidelink communications.

SUMMARY

The described techniques relate to improved methods, systems, devices, and apparatuses that support sidelink communications using a sidelink resource pool configured for a different radio access technology (RAT). Generally, the described techniques provide for a transmitting user equipment (UE) and a receiving UE to communicate sidelink messages of a second RAT using a sidelink resource pool initially configured for a first RAT that is different than the second RAT. For example, the receiving UE may receive a first sidelink message in a sidelink control channel configured for a first RAT (e.g., Long Term Evolution (LTE)), may determine a set of time and frequency resources indicated by the first sidelink message received in the sidelink control channel, and then may monitor the set of time and frequency resources to receive a second sidelink message configured for a second RAT (e.g., New Radio (NR)). In some implementations, the first sidelink message received in the sidelink control channel may include a field that indicates the set of time and frequency resources are configured for or that the set of time and frequency resources may be used for communications associated with the second RAT. Additionally, or alternatively, the receiving UE may receive an additional sidelink message indicating the set of time and frequency resources are configured for or may be used for communications associated with the second RAT. A same transmitting UE may transmit both the first sidelink message in the sidelink control channel and the second sidelink message on the set of time and frequency resources indicated by the first sidelink message, or a first transmitting UE may transmit the first sidelink message in the sidelink control channel, and a second UE may transmit the second sidelink message on the set of time and frequency resources indicated by the first sidelink message transmitted in the sidelink control channel.

In some implementations, the first RAT may use a first subcarrier spacing (SCS), such that the sidelink control channel is transmitted and received according to this first SCS, and the second RAT may use a second SCS, such that the second sidelink message is transmitted and received according to the second SCS. Based on these different SCSs, a single transmission time interval (TTI) for the first RAT (e.g., an LTE slot) may span multiple TTIs for the second RAT (e.g., multiple NR slots). For example, the sidelink control channel may extend for a first length of time, and the second sidelink message may extend for a second length of time shorter than the first length of time, such that once a transmission and reception occasion for the second sidelink message elapses, the set of time and frequency resources indicated by the first sidelink message received in the sidelink control channel are still reserved. Accordingly, the remaining portion of the reserved set of time and frequency resources after the second sidelink message is done may be used for retransmissions of the sidelink message, may be used by additional UEs, may be used for a transport block (TB) that spans multiple TTIs for the second RAT, may be used for aggregating the multiple TTIs for the second RAT, or a combination thereof.

A method of wireless communications at a receiving device is described. The method may include receiving a first sidelink message in a sidelink control channel configured for a first RAT, determining a set of time and frequency resources indicated by the first sidelink message received in the sidelink control channel, and monitoring, on the set of time and frequency resources, for a second sidelink message associated with a second RAT, the second RAT being different than the first RAT.

An apparatus for wireless communications at a receiving device is described. The apparatus may include a processor, memory coupled with the processor, and instructions stored in the memory. The instructions may be executable by the processor to cause the apparatus to receive a first sidelink message in a sidelink control channel configured for a first RAT, determine a set of time and frequency resources indicated by the first sidelink message received in the sidelink control channel, and monitor, on the set of time and frequency resources, for a second sidelink message associated with a second RAT, the second RAT being different than the first RAT.

Another apparatus for wireless communications at a receiving device is described. The apparatus may include means for receiving a first sidelink message in a sidelink control channel configured for a first RAT, determining a set of time and frequency resources indicated by the first sidelink message received in the sidelink control channel, and monitoring, on the set of time and frequency resources, for a second sidelink message associated with a second RAT, the second RAT being different than the first RAT.

A non-transitory computer-readable medium storing code for wireless communications at a receiving device is described. The code may include instructions executable by a processor to receive a first sidelink message in a sidelink control channel configured for a first RAT, determine a set of time and frequency resources indicated by the first sidelink message received in the sidelink control channel, and monitor, on the set of time and frequency resources, for a second sidelink message associated with a second RAT, the second RAT being different than the first RAT.

Some examples of the method, apparatuses, and non-transitory computer-readable medium described herein may further include operations, features, means, or instructions for determining a first SCS associated with the first RAT may be different than a second SCS associated with the second RAT, where multiple TTIs configured for the second RAT overlap with a single TTI for the sidelink control channel based on the first SCS being different than the second SCS.

In some examples of the method, apparatuses, and non-transitory computer-readable medium described herein, monitoring for the second sidelink message may include operations, features, means, or instructions for monitoring for the second sidelink message in a first TTI of the multiple TTIs.

Some examples of the method, apparatuses, and non-transitory computer-readable medium described herein may further include operations, features, means, or instructions for monitoring for a retransmission of the second sidelink message in one or more remaining TTIs of the multiple TTIs after the first TTI.

In some examples of the method, apparatuses, and non-transitory computer-readable medium described herein, one or more of the multiple TTIs after the first TTI may be available for use by additional devices operating in the second RAT.

Some examples of the method, apparatuses, and non-transitory computer-readable medium described herein may further include operations, features, means, or instructions for determining the second sidelink message includes a TB that spans two or more TTIs of the multiple TTIs, and monitoring for the TB in each of the two or more TTIs.

Some examples of the method, apparatuses, and non-transitory computer-readable medium described herein may further include operations, features, means, or instructions for determining the second sidelink message may be transmitted in two or more TTIs of the multiple TTIs, and monitoring for the second sidelink message in each of the two or more TTIs, where the receiving device may combine each received instance of the sidelink message from the two or more TTIs.

In some examples of the method, apparatuses, and non-transitory computer-readable medium described herein, the second sidelink message may be transmitted in the two or more TTIs based on a redundancy version (RV) cycling configuration.

Some examples of the method, apparatuses, and non-transitory computer-readable medium described herein may further include operations, features, means, or instructions for receiving the first sidelink message in the sidelink control channel and the second sidelink message from a same transmitting device.

Some examples of the method, apparatuses, and non-transitory computer-readable medium described herein may further include operations, features, means, or instructions for receiving the first sidelink message in the sidelink control channel from a first transmitting device, and receiving the second sidelink message from a second transmitting device.

In some examples of the method, apparatuses, and non-transitory computer-readable medium described herein, receiving the first sidelink message in the sidelink control channel may include operations, features, means, or instructions for receiving a field in the first sidelink message in the sidelink control channel indicating the set of time and frequency resources configured for the second RAT.

In some examples of the method, apparatuses, and non-transitory computer-readable medium described herein, receiving the first sidelink message in the sidelink control channel may include operations, features, means, or instructions for receiving the first sidelink message in the sidelink control channel as part of a semi-persistent scheduling (SPS) process, and receiving an additional sidelink message indicating the set of time and frequency resources available for the second sidelink message configured for the second RAT.

In some examples of the method, apparatuses, and non-transitory computer-readable medium described herein, the set of time and frequency resource include time and frequency resources for a sidelink feedback channel associated with the second RAT.

In some examples of the method, apparatuses, and non-transitory computer-readable medium described herein, the first RAT may be LTE, and the second RAT may be NR.

A method of wireless communications at a transmitting device is described. The method may include determining a sidelink control channel configured for a first RAT, determining a set of time and frequency resources indicated by a first sidelink message in the sidelink control channel, and transmitting, on the set of time and frequency resources, a second sidelink message associated with a second RAT, the second RAT being different than the first RAT.

An apparatus for wireless communications at a transmitting device is described. The apparatus may include a processor, memory coupled with the processor, and instructions stored in the memory. The instructions may be executable by the processor to cause the apparatus to determine a sidelink control channel configured for a first RAT, determine a set of time and frequency resources indicated by a first sidelink message in the sidelink control channel, and transmit, on the set of time and frequency resources, a second sidelink message associated with a second RAT, the second RAT being different than the first RAT.

Another apparatus for wireless communications at a transmitting device is described. The apparatus may include means for determining a sidelink control channel configured for a first RAT, determining a set of time and frequency resources indicated by a first sidelink message in the sidelink control channel, and transmitting, on the set of time and frequency resources, a second sidelink message associated with a second RAT, the second RAT being different than the first RAT.

A non-transitory computer-readable medium storing code for wireless communications at a transmitting device is described. The code may include instructions executable by a processor to determine a sidelink control channel configured for a first RAT, determine a set of time and frequency resources indicated by a first sidelink message in the sidelink control channel, and transmit, on the set of time and frequency resources, a second sidelink message associated with a second RAT, the second RAT being different than the first RAT.

Some examples of the method, apparatuses, and non-transitory computer-readable medium described herein may further include operations, features, means, or instructions for determining a first SCS associated with the first RAT may be different than a second SCS associated with the second RAT, where multiple TTIs associated with the second RAT overlap with a single TTI for the sidelink control channel based on the first SCS being different than the second SCS.

In some examples of the method, apparatuses, and non-transitory computer-readable medium described herein, transmitting the second sidelink message may include operations, features, means, or instructions for transmitting the second sidelink message in a first TTI of the multiple TTIs.

Some examples of the method, apparatuses, and non-transitory computer-readable medium described herein may further include operations, features, means, or instructions for transmitting a retransmission of the second sidelink message in one or more remaining TTIs of the multiple TTIs after the first TTI.

In some examples of the method, apparatuses, and non-transitory computer-readable medium described herein, one or more of the multiple TTIs after the first TTI may be available for use by additional devices operating in the second RAT.

Some examples of the method, apparatuses, and non-transitory computer-readable medium described herein may further include operations, features, means, or instructions for determining the second sidelink message includes a TB that spans two or more TTIs of the multiple TTIs, and transmitting the TB in each of the two or more TTIs.

Some examples of the method, apparatuses, and non-transitory computer-readable medium described herein may further include operations, features, means, or instructions for transmitting the second sidelink message in two or more TTIs of the multiple TTIs.

Some examples of the method, apparatuses, and non-transitory computer-readable medium described herein may further include operations, features, means, or instructions for transmitting the first sidelink message in the sidelink control channel, the first sidelink message indicating the set of time and frequency resources.

In some examples of the method, apparatuses, and non-transitory computer-readable medium described herein, transmitting the first sidelink message in the sidelink control channel may include operations, features, means, or instructions for transmitting a field in the first sidelink message in the sidelink control channel indicating the set of time and frequency resources configured for the second RAT.

In some examples of the method, apparatuses, and non-transitory computer-readable medium described herein, transmitting the first sidelink message in the sidelink control channel may include operations, features, means, or instructions for transmitting the first sidelink message in the sidelink control channel as part of an SPS process, and transmitting an additional sidelink message indicating the set of time and frequency resources available for the sidelink message configured for the second RAT.

Some examples of the method, apparatuses, and non-transitory computer-readable medium described herein may further include operations, features, means, or instructions for receiving the first sidelink message in the sidelink control channel.

In some examples of the method, apparatuses, and non-transitory computer-readable medium described herein, the set of time and frequency resource include time and frequency resources for a sidelink feedback channel associated with the second RAT.

In some examples of the method, apparatuses, and non-transitory computer-readable medium described herein, the first RAT may be LTE, and the second RAT may be NR.

BRIEF DESCRIPTION OF THE DRAWINGS

FIGS. 10 through 16 show flowcharts illustrating methods that support sidelink communications using a sidelink resource pool configured for a different radio access technology in accordance with aspects of the present disclosure.

DETAILED DESCRIPTION

Figure 1:
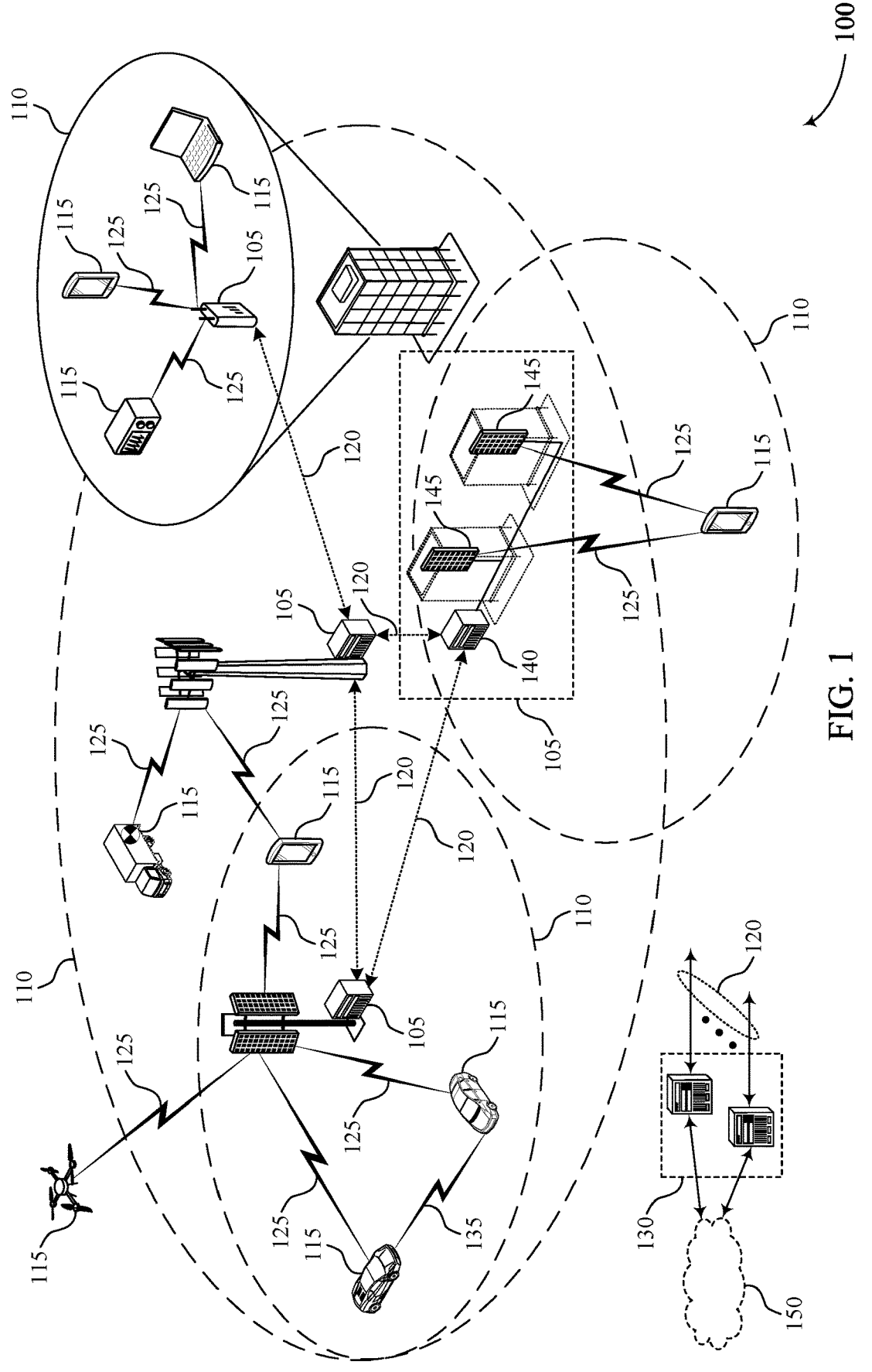
FIG. 1 illustrates an example of a system for wireless communications that supports sidelink communications using a sidelink resource pool configured for a different radio access technology (RAT) in accordance with aspects of the present disclosure.

In some wireless communications systems, to enable sidelink communications for a first radio access technology (RAT) (e.g., Long-Term Evolution (LTE), fourth generation (4G) communications, etc.), a device may transmit a physical sidelink control channel (PSCCH) to indicate a resource pool (e.g., a set of time and frequency resources) reserved for the sidelink communications. Subsequently, the device (e.g., or an additional device) may then transmit a sidelink message (e.g., as part of a physical sidelink shared channel (PSSCH)) to a receiving device using the resource pool. In some cases (e.g., for LTE), the PSCCH and the sidelink message/PSSCH may be frequency division multiplexed (FDMed) in a same subframe (e.g., the PSCCH and the PSSCH are transmitted in a same span of time resources but on different frequency resources). However, for sidelink communications in a second RAT (e.g., New Radio (NR), fifth generation (5G) communications, etc.), a PSCCH and a PSSCH may be both FDMed and time-division duplexed (TDMed) in a same subframe (e.g., the PSCCH and the PSSCH may overlap in both time and frequency). Techniques are desired to accommodate sidelink transmissions configured for the second RAT to take place within a sidelink resource pool initially configured for the first RAT or signaled using the first RAT.

As described herein, a PSSCH indicated by a PSCCH signaled using a first RAT (e.g., LTE PSCCH) may be used for a sidelink transmission configured for a second RAT (e.g., an NR PSCCH, an NR PSSCH, an NR sidelink message, etc.). For example, a receiving device (e.g., a receiving UE, a first UE, etc.) may receive the PSCCH (e.g., a first sidelink message in the PSCCH) associated with the first RAT, determine a sidelink resource pool indicated by the PSCCH, and then monitor for and receive a sidelink message (e.g., a second sidelink message) associated with the second RAT in the sidelink resource pool. In some cases, if a first subcarrier spacing (SCS) for the PSCCH associated with the first RAT is different from a second SCS for the sidelink message associated with the second RAT such that the PSCCH covers a greater number of transmission time intervals (TTIs) than would be used for the sidelink message, the excess TTIs may be used by other devices (e.g., for additional NR communications), may be used for retransmissions, may be used for a transport block (TB) that spans multiple slots, or may be aggregated (e.g., to combine multiple instances of the sidelink message to fully receive and decode the sidelink message).

Additionally, or alternatively, a same device (e.g., a same transmitting device, a same UE, a second UE, etc.) that transmits the PSCCH associated with the first RAT may transmit the sidelink message associated with the second RAT. Alternatively, a first device (e.g., a first transmitting device, the second UE, etc.) may transmit the PSCCH associated with the first RAT, and a second device (e.g., a second transmitting device, a third UE, etc.) may transmit the sidelink message associated with the second RAT. In some implementations, a field in the PSCCH may indicate that the sidelink resource pool (e.g., reserved sidelink resources) may be used for communications associated with the second RAT (e.g., the sidelink message). Additionally, or alternatively, in a first PSCCH associated with the first RAT of a semi-persistent scheduling (SPS) process, a device (e.g., transmitting device, transmitting UE, etc.) may send a first sidelink message associated with the second RAT indicating which resources are available for NR sidelink transmissions.

Aspects of the disclosure are initially described in the context of wireless communications systems. Additionally, or alternatively, aspects of the disclosure are illustrated through an additional wireless communications system, examples of sidelink resource allocations, and a process flow. Aspects of the disclosure are further illustrated by and described with reference to apparatus diagrams, system diagrams, and flowcharts that relate to sidelink communications using a sidelink resource pool configured for a different RAT.

FIG. 1 illustrates an example of a wireless communications system 100 that supports sidelink communications using a sidelink resource pool configured for a different RAT in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a first UE may communicate with a second UE directly via sidelink communications. To enable sidelink communications for LTE communications (e.g., a first RAT), the first UE may transmit a PSCCH to indicate a resource pool (e.g., a set of time and frequency resources) reserved for the sidelink communications. Subsequently, the first UE (e.g., or an additional transmitting device) may then transmit a sidelink message (e.g., as part of a PSSCH) to the second UE (e.g., a receiving device) using the resource pool. In some cases (e.g., for LTE), the PSCCH and the sidelink message/PSSCH may be FDMed in a same subframe (e.g., the PSCCH and the PSSCH are transmitted in a same span of time resources but on different frequency resources). However, for sidelink communications in NR communications (e.g., a second RAT), a PSCCH and a PSSCH may be both FDMed and TDMed in a same subframe (e.g., the PSCCH and the PSSCH may overlap in both time and frequency). Techniques are desired to enable transmission of NR sidelink messages within an LTE sidelink resource pool.

Wireless communications system 100 may support efficient techniques for using a resource pool initially reserved for a first RAT to transmit sidelink messages associated with a second RAT different than the first RAT. For example, a sidelink shared channel (e.g., a PSSCH) indicated by a PSCCH (e.g., a first sidelink message in the PDSCCH) signaled using a first RAT (e.g., LTE PSCCH) may be used for a sidelink transmission (e.g., a second sidelink message) configured for a second RAT (e.g., an NR PSCCH, an NR PSSCH, an NR sidelink message, etc.). In some implementations, a same device (e.g., a same transmitting device, a same UE, a second UE, etc.) that transmits the PSCCH associated with the first RAT may transmit the sidelink transmission associated with the second RAT, or different devices may transmit the PSCCH associated with the first RAT and the sidelink transmission associated with the second RAT, respectively. Additionally, or alternatively, the set of time and frequency resource may be indicated that they may be used for the second RAT via a field in the sidelink control channel or via an additional sidelink message associated with the second RAT transmitted with the sidelink control channel. Additional techniques may be designed and implemented for situations where the first RAT and the second RAT use different SCSs.

Figure 2:
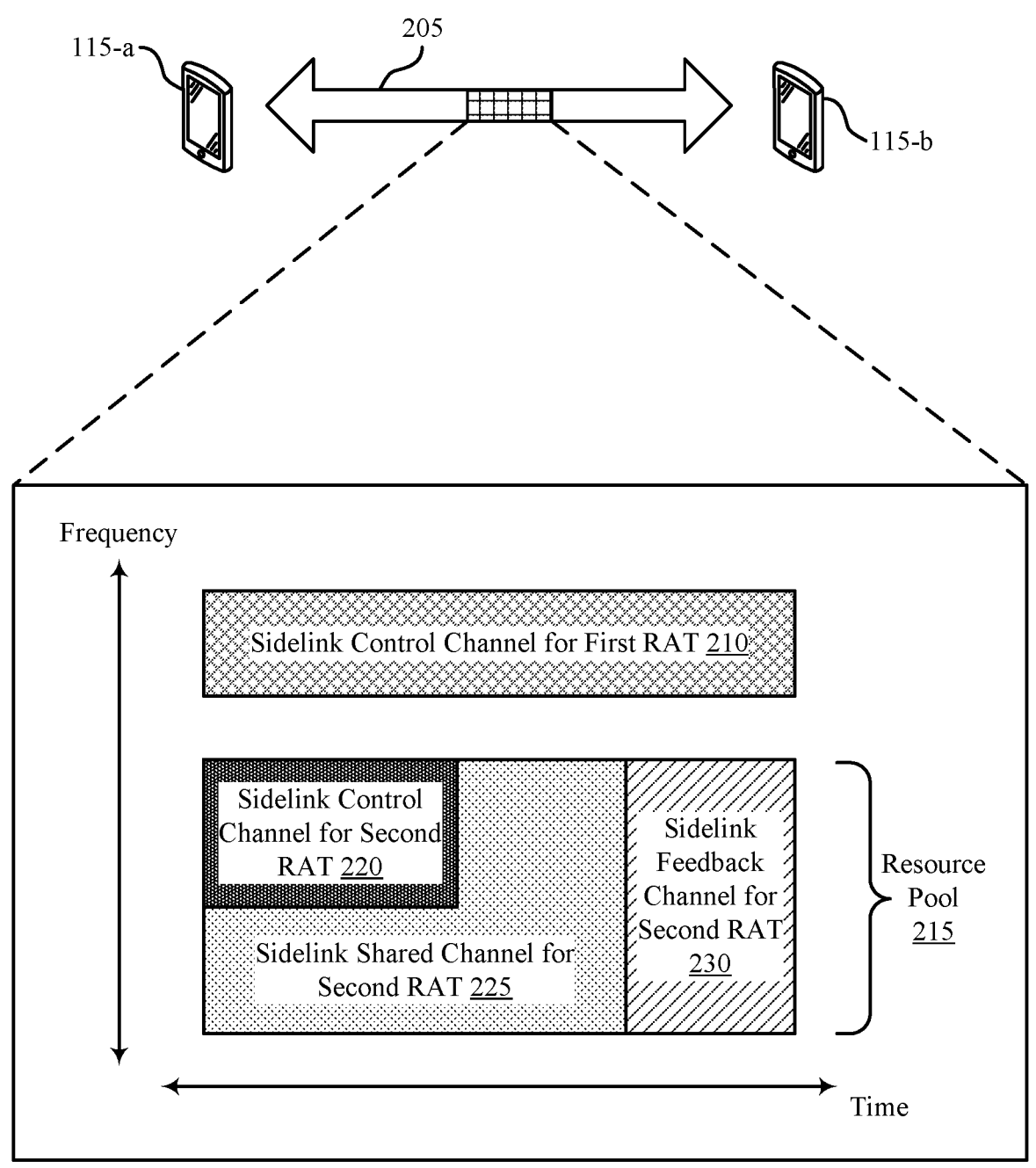
FIG. 2 illustrates an example of a wireless communications system that supports sidelink communications using a sidelink resource pool configured for a different RAT in accordance with aspects of the present disclosure.

FIG. 2 illustrates an example of a wireless communications system 200 that supports sidelink communications using a sidelink resource pool configured for a different RAT in accordance with aspects of the present disclosure. In some examples, the wireless communications system 200 may implement aspects of wireless communications system 100. For example, the wireless communications system 200 may include a first UE 115-*a* and a second UE 115-*b*, which may represent examples of corresponding UEs 115 as described with reference to FIG. 1. Additionally, or alternatively, the first UE 115-*a* and the second UE 115-*b* may support sidelink communications with each other or with other UEs 115. As shown, the first UE 115-*a* and the second UE 115-*b* may communicate with each other (e.g., via sidelink communications) on resources of a carrier 205.

In some cases, the first UE 115-*a* and the second UE 115-*b* may support communications associated with a first RAT (e.g., LTE), a second RAT (e.g., NR), or both RATs. For example, both UEs 115 may be configured for communications with the second RAT, where communications with the first RAT are backwards compatible based on the configurations for communications with the second RAT.

For sidelink communications associated with the first RAT, resources may be reserved and indicated in a sidelink control channel associated with the first RAT, where the indicated resources are then used for communicating sidelink messages between the UEs 115. Additionally, or alternatively, the sidelink control channel may be transmitted on a first set of time and frequency resources, and the resources indicated by the sidelink control channel may be located on a second set of time and frequency resources that occur during a same time duration as the first set of time and frequency resources (e.g., the sidelink control channel and the resources are FDMed, where each occur on a same set of time resources but on different frequencies).

For sidelink communications associated with the second RAT, a sidelink control channel associated with the second RAT may also indicate resources that may be used for communications of sidelink messages associated with the second RAT. However, this sidelink control channel and the indicated resources may occupy overlapping time and frequency resources (e.g., the sidelink control channel and the resources are both TDMed and FDMed, where each occur on at least a subset of same time resources and a subset of same frequency resources). Based on the different RATs using different resources for the sidelink communications with respect to a sidelink control channel associated with a corresponding RAT indicating the resources, compatibility between sidelink communications on the different RATs may be impacted.

As described herein, techniques are described for enabling sidelink transmissions associated with the second RAT to take places within a sidelink resource pool (e.g., indicated resources) initially associated with the first RAT. For example, a sidelink control channel 210 (e.g., a PSCCH) may be associated with the first RAT (e.g., LTE). A first sidelink message communicated in the sidelink control channel 210 may indicate a resource pool 215 that may be used for sidelink communications also associated with the first RAT. For example, the resource pool 215 may represent a set of time and frequency resource reserved for the sidelink communications associated with the first RAT. In some cases, the resource pool 215 may be used for a sidelink shared channel (e.g., a PSSCH) associated with the first RAT. However, the resource pool 215 may not be used by the UEs 115 for sidelink communications associated with the first RAT.

Accordingly, the UEs 115 may replace using the resource pool 215 for the sidelink shared channel associated with the first RAT to using the resource pool 215 for sidelink transmissions or sidelink messages associated with the second RAT. That is, the first sidelink message communicated in the sidelink control channel 210 associated with the first RAT may reserve the set of time and frequency resources of the resource pool 215 in a backwards compatible way for the first RAT (e.g., the set of time and frequency resources indicated by the sidelink control channel 210 associated with the first RAT may be used for sidelink communications associated with the first RAT or the second RAT). For example, the resource pool 215 may be used for the sidelink shared channel associated with the first RAT or may be used for a sidelink control channel 220 and a sidelink shared channel 225 associated with the second RAT. Additionally, or alternatively, the first sidelink message communicated in the sidelink control channel 210 may reserve a first set of time and frequency resources for communications associated with the first RAT and may reserve a second set of time and frequency resources for communications associated with the second RAT, where the first set of time and frequency resources and the second set of time and frequency resources may be the same or different.

Additionally, or alternatively, at least a portion of the set of time and frequency resources included with the resource pool 215 may be used for a sidelink feedback channel 230 (e.g., a physical sidelink feedback channel (PSFCH)) associated with the second RAT. For example, the UEs 115 may use the sidelink feedback channel 230 to communicate acknowledgment feedback, signal measurements, channel quality indications, etc., about the sidelink communications associated with the second RAT.

In some implementations, a field in the first sidelink message communicated in the sidelink control channel 210 associated with the first RAT may indicate that the set of time and frequency resources of the resource pool 215 (e.g., reserved resources) are used for sidelink communications associated with the second RAT (e.g., the sidelink control channel 220, the sidelink shared channel 225, the sidelink feedback channel 230, etc., each associated with the second RAT). For example, this field in the first sidelink message communicated in the sidelink control channel 210 associated with the first RAT may be a reserved bit in the first sidelink message (e.g., in the sidelink control channel 210).

Additionally, or alternatively, in a first sidelink control channel (e.g., in the first sidelink message) associated with the first RAT (e.g., an LTE PSCCH) that is transmitted as part of an SPS process (e.g., multiple sidelink control channels may be transmitted based on a periodic schedule for the SPS process), a transmitting UE 115 may also send a sidelink message (e.g., an additional sidelink message) associated with the second RAT (e.g., an NR sidelink message) that indicates which resources are available for sidelink communications associated with the second RAT (e.g., NR sidelink transmissions). In some implementations, the resources indicated in the sidelink message associated with the second RAT may be assigned to different UEs 115. Additionally, or alternatively, sensing and resource selection procedures associated with the second RAT may be applied to the resources indicated in the sidelink message.

In some implementations, the UEs 115 (e.g., or additional UEs 115 that support communications associated with the second RAT, such as NR UEs 115) may process the first sidelink message received in the sidelink control channel 210 associated with the first RAT to avoid resource colli- sions. For example, prior to using the set of time and frequency resources included with the resource pool 215, the UEs 115 may process the first sidelink message received in the sidelink control channel 210 associated with the first RAT to identify the set of time and frequency resources and identify whether the resources are being used for sidelink communications associated with the first RAT or not. Addi- tionally, or alternatively, transmission of the sidelink control channel 210 associated with the first RAT may be disabled, and the UEs 115 may use the resource pool 215 for sidelink communications associated with the second RAT without identifying the resources using the sidelink control channel 210 associated with the first RAT.

Additionally, or alternatively, a same UE 115 that trans- mits the first sidelink message in the sidelink control channel 210 associated with the first RAT may transmit sidelink communications (e.g., a second sidelink message) associ- ated with the second RAT (e.g., the sidelink control channel 220, the sidelink shared channel 225, the sidelink feedback channel 230, etc.). Alternatively, an additional UE 115 may transmit the first sidelink message in the sidelink control channel 210 associated with the first RAT, and a different UE 115 may transmit the sidelink communications (e.g., second sidelink message) associated with the second RAT. For example, a UE 115 may transmit the first sidelink message in the sidelink control channel 210 associated with the first RAT indicating the resource pool 215 that may be used for the sidelink communications associated with the second RAT, and a different UE 115 may receive this indication of the resource pool 215 by receiving the first sidelink message in the sidelink control channel 210 and may then use the resource pool 215 to transmit sidelink communications associated with the second RAT.

Figure 3A:
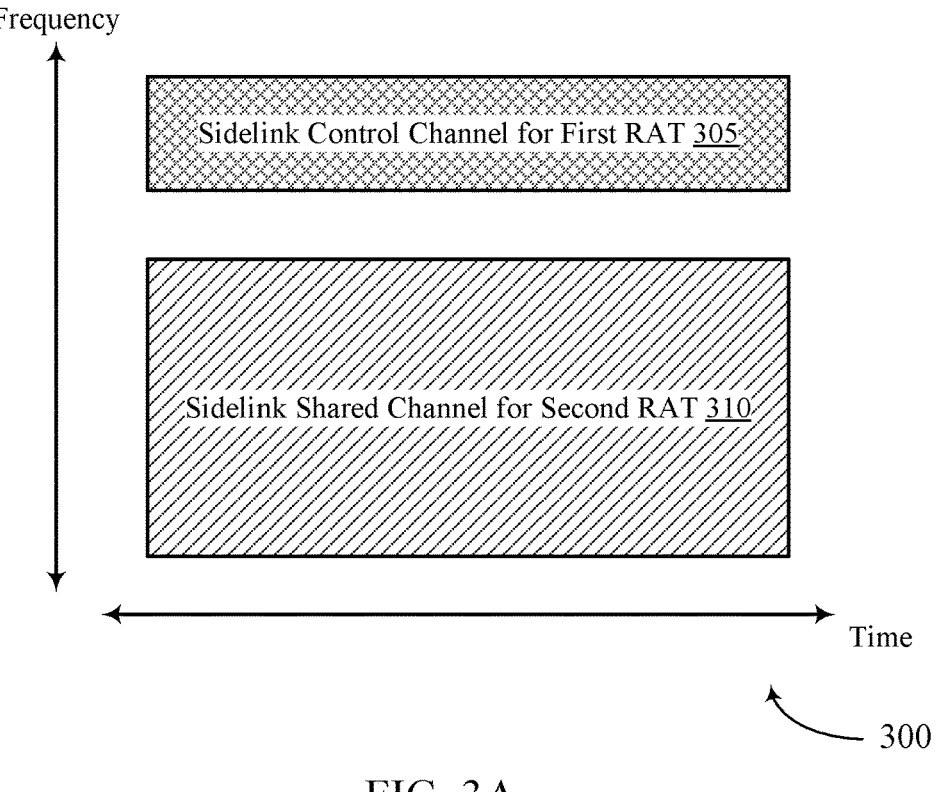
FIGS. 3A and 3B illustrate examples of sidelink resource allocations for different RATs in accordance with aspects of the present disclosure.
Figure 3B:
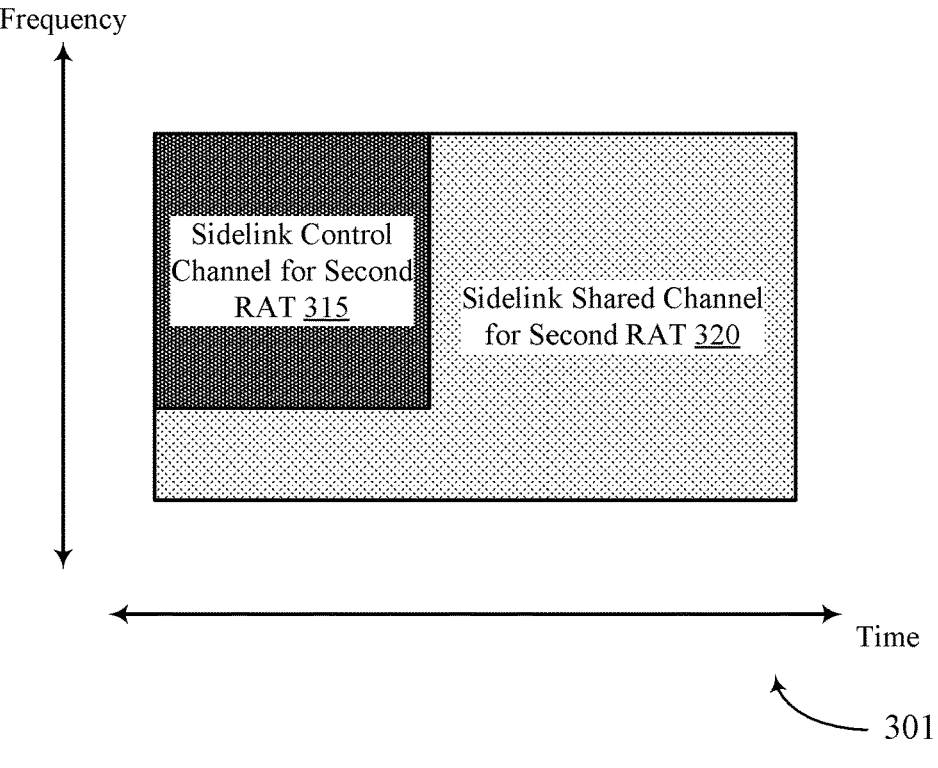

FIGS. 3A and 3B illustrate examples of sidelink resource allocations 300 and 301 in accordance with aspects of the present disclosure. In some examples, the sidelink resource allocations 300 and 301 may implement aspects of wireless communications systems 100 and 200. For example, two or more UEs 115 may use the sidelink resource allocations 300 and 301 to communicate with each other over a sidelink connection. Each sidelink resource allocation may include a sidelink control channel that is used to communicate control information between the UEs 115 and a sidelink shared channel that is used to communicate sidelink messages between the UEs 115.

The sidelink resource allocation 300 may represent a configuration associated with a first RAT. For example, the sidelink resource allocation 300 may be used for sidelink communications associated with LTE (e.g., LTE V2X com- munications). Additionally, or alternatively, the sidelink resource allocation 300 may include a sidelink control channel 305 associated with the first RAT (e.g., an LTE PSCCH) and a sidelink shared channel 310 associated with the first RAT (e.g., an LTE PSSCH), where the sidelink control channel 305 and the sidelink shared channel 310 are FDMed in a same subframe (e.g., or a different length TTI). In some cases, the sidelink control channel 305 may indicate the resources that are reserved for the sidelink shared channel 310, such that a UE 115 may receive and decode the sidelink control channel 305 to identify the resources (e.g., and additional control information) to then use the sidelink shared channel 310 for sidelink communications. Addition- ally, or alternatively, the sidelink resource allocation 300 may use a DFT spread (DFTs) waveform with a first SCS (e.g., a 15 kHz SCS). In some cases, separate DFT and reference signals may be used for the sidelink control channel 305 and the sidelink shared channel 310. Addition- ally, or alternatively, the sidelink control channel 305 and the sidelink shared channel 310 may not be adjacent in fre- quency.

In some cases, the sidelink control channel 305 may span two (2) physical resource blocks (PRBs). Additionally, or alternatively, a sub-channel size for the sidelink resource allocation 300 may depend on whether the sidelink control channel 305 and the sidelink shared channel 310 are adja- cent in frequency or not. For example, if the sidelink control channel 305 and the sidelink shared channel 310 are adja- cent in frequency, then the sidelink resource allocation 300 may span one of a first set of PRB amounts, such as {5, 6, 10, 15, 20, 25, 50, 75, 100}PRBs. Alternatively, if the sidelink control channel 305 and the sidelink shared channel 310 are not adjacent in frequency, then the sidelink resource allocation 300 may span one of a second set of PRB amounts, such as {4, 5, 6, 8, 9, 10, 12, 15, 16, 18, 20, 30, 48, 72, 96} PRBs.

For the sidelink resource allocation 300 associated with the first RAT, resource reservations (e.g., the resources indicated by the sidelink control channel 305 for the sidelink shared channel 310) may be periodic with up to two (2) retransmissions in a period. For example, the period values for the resource reservations may include {20-50, 100, 200, . . . , 1000} ms. Additionally, or alternatively, the sidelink resource allocation 300 may not include resources that may be used for feedback transmissions. In some cases, to select resources for the sidelink shared channel 310, the UEs 115 may perform a signal measurement (e.g., a reference signal received power (RSRP) measurement) on reference signals (e.g., demodulation reference signals (DMRSs)) transmit- ted/received on the sidelink shared channel 310.

The sidelink resource allocation 301 may represent a configuration associated with a second RAT. For example, the sidelink resource allocation 301 may be used for sidelink communications associated with NR (e.g., NR V2X com- munications). Additionally, or alternatively, the sidelink resource allocation 301 may include a sidelink control channel 315 associated with the second RAT (e.g., an NR PSCCH) and a sidelink shared channel 320 associated with the second RAT (e.g., an NR PSSCH), where the sidelink control channel 315 and the sidelink shared channel 320 are FDMed and TDMed in a same subframe (e.g., or a different length TTI). Additionally, or alternatively, the sidelink resource allocation 301 may use a cyclic prefix OFDM (CP-OFDM) waveform is used with variable SCSs (e.g., 15, 30, 60, 120, etc. kHz SCS), and separate reference signals may be used for the sidelink control channel 315 and the sidelink shared channel 320, respectively.

In some cases, the sidelink control channel 315 may span 10, 12, 15, 20, or 25 PRBs and two (2) or (3) OFDM symbols. Additionally, or alternatively, the sidelink resource allocation 301 may include a sub-channel size of 10, 12, 15, 20, 25, 50, 75, or 100 RBs. In some cases, resource reservations (e.g., the resources indicated by the sidelink control channel 315 for the sidelink shared channel 320) may be aperiodic or periodic with up to 32 retransmissions. For the periodic resource reservations, the period values may include {1:100, 200, . . . , 1000} ms. Additionally, or alternatively, the sidelink resource allocation 301 may include feedback that may be transmitted on a sidelink feedback channel (e.g., PSFCH) for the sidelink shared channel 320. In some cases, the sidelink feedback channel may be enabled or disabled. Additionally, or alternatively, to select resources for the sidelink shared channel 320, the UEs 115 may perform a signal measurement (e.g., an RSRP measurement) on reference signals (e.g., demodulation reference signals (DMRSs)) transmitted/received on the sidelink control channel 315 or the sidelink shared channel 320.

Figure 4:
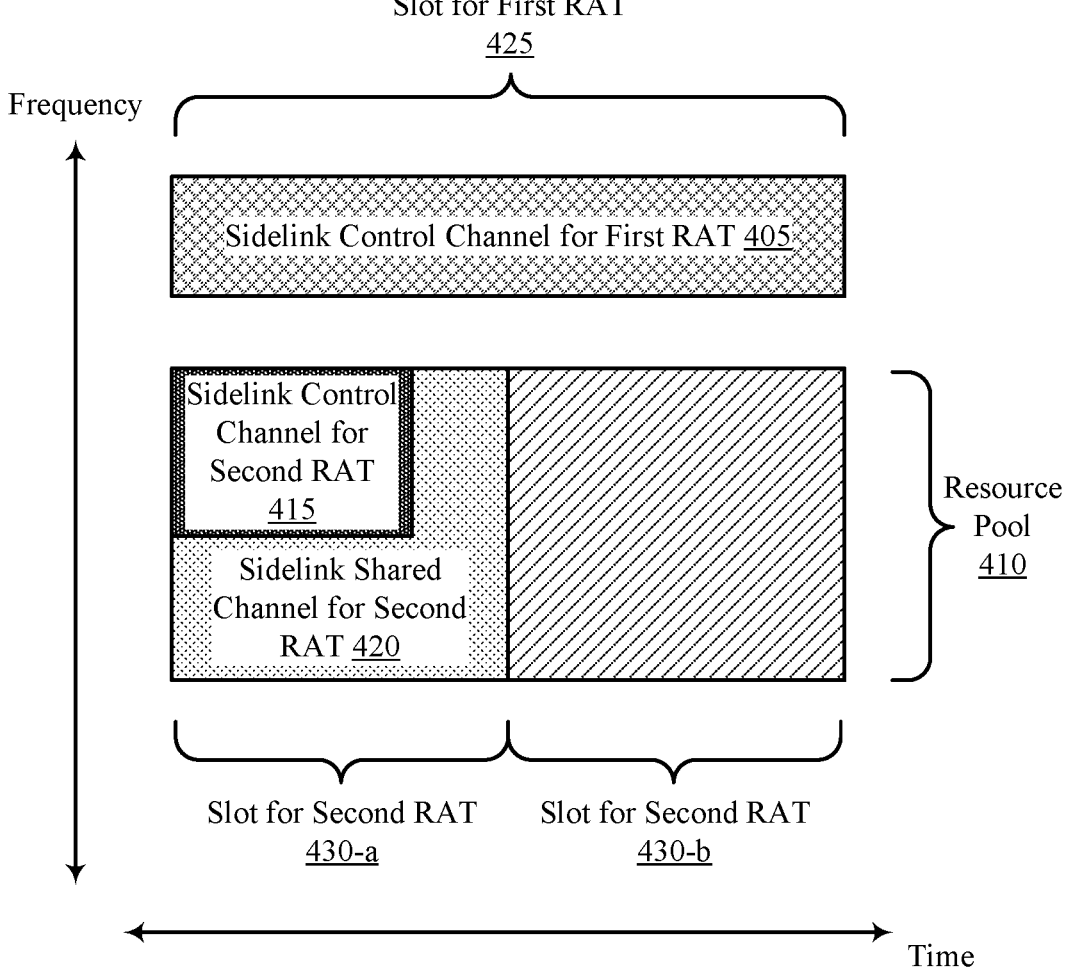
FIG. 4 illustrates an example of a sidelink resource allocation that supports sidelink communications using a sidelink resource pool configured for a different RAT in accordance with aspects of the present disclosure.

FIG. 4 illustrates an example of a sidelink resource allocation 400 that supports sidelink communications using a sidelink resource pool configured for a different RAT in accordance with aspects of the present disclosure. In some examples, sidelink resource allocation 400 may implement aspects of wireless communications systems 100 and 200. For example, two (2) UEs 115 may use the sidelink resource allocation 400 for communications with each other over a sidelink connection. Additionally, or alternatively, as described herein, the sidelink resource allocation 400 may include a sidelink control channel 405 (e.g., a PSCCH, a first sidelink message in the PSCCH, etc.) associated with a first RAT (e.g., LTE) that indicates a resource pool 410 of a set of time and frequency resources reserved for sidelink communications, where the resource pool 410 may be used for sidelink communications (e.g., a second sidelink message) associated with a second RAT (e.g., NR) that is different than the first RAT. That is, the UEs 115 may use the resource pool 410 to communicate one or more sidelink messages associated with the second RAT, such as a sidelink control channel 415 (e.g., a PSCCH) for the second RAT and a sidelink shared channel 420 (e.g., a PSSCH) for the second RAT.

However, in some implementations, communications associated with the first RAT (e.g., the sidelink control channel 405) and communications associated with the second RAT (e.g., the sidelink control channel 415 the sidelink shared channel 420) may include different SCSs from each other, impacting using the resource pool 410 for the communications associated with the second RAT. For example, the communications associated with the first RAT may include a first SCS (e.g., 15 kHz SCS), and the communications associated with the second RAT may include a second SCS (e.g., 30 kHz SCS). Based on the different SCSs, multiple slots for the second RAT may overlap with a single slot for the first RAT. For example, as shown, the communications with the first RAT may occur over a slot 425 for the first RAT (e.g., an LTE slot), and within this slot 425, multiple slots 430 may occur for the second RAT (e.g., NR slots), such as a first slot 430-a for the second RAT and a second slot 430-b for the second RAT. The resource pool 410 indicated by the sidelink control channel 405 may be reserved for the entirety of the slot 425 for the first RAT, but since multiple slots 430 for the second RAT occur within the slot 425, the UEs 115 may not know which slot 430 to use for sidelink communications associated with the second RAT or how to use any remaining slots 430 after sidelink communications associated with the second RAT have occurred.

As shown, the UEs 115 may determine to use the first slot 430-a for the sidelink communications associated with the second RAT (e.g., the sidelink control channel 415 and the sidelink shared channel 420). Additionally, or alternatively, the UEs 115 may determine to use a different slot 430 than the first slot 430-a. Once the sidelink communications associated with the second RAT are finished, the second slot 430-b may still be reserved within the resource pool 410. Accordingly, the UEs 115 may have different options for how to use the second slot 430-b.

In some implementations, the second slot 430-b (e.g., and any additional slots 430 after the sidelink communications have occurred) may be used by other UEs 115 (e.g., other than the two (2) UEs 115 that used the first slot 430-a for the sidelink communications). Additionally, or alternatively, the second slot 430-b (e.g., and any additional slots 430) may be used by a same UE 115 that transmitted sidelink message(s) in the first slot 430-a (e.g., for retransmission(s) of the sidelink message(s)). In other implementations, the second slot 430-b (e.g., and any additional slots 430) may be used where a TB spans multiple slots (e.g., a transmitting UE 115 transmits a sidelink message using a TB that spans multiple slots 430). Additionally, or alternatively, the second slot 430-b (e.g., and any additional slots 430) may be aggregated by a receiving UE 115 to fully receive and decode a sidelink message transmitted by a transmitting UE 115. For example, the transmitting UE 115 may transmit the sidelink message using multiple instances of the sidelink message in respective slots 430, where each instance of the sidelink message is transmitted based on redundancy version (RV) cycling (e.g., each instance of the sidelink message is transmitted with a different RV), and the receiving UE 115 may aggregate or combine the multiple instances of the sidelink message across the multiple slots 430 to fully receive and decode the sidelink message. In some implementations, the second slot 430-b (e.g., and any additional slots 430) may be empty and not used by any UEs 115.

Figure 5:
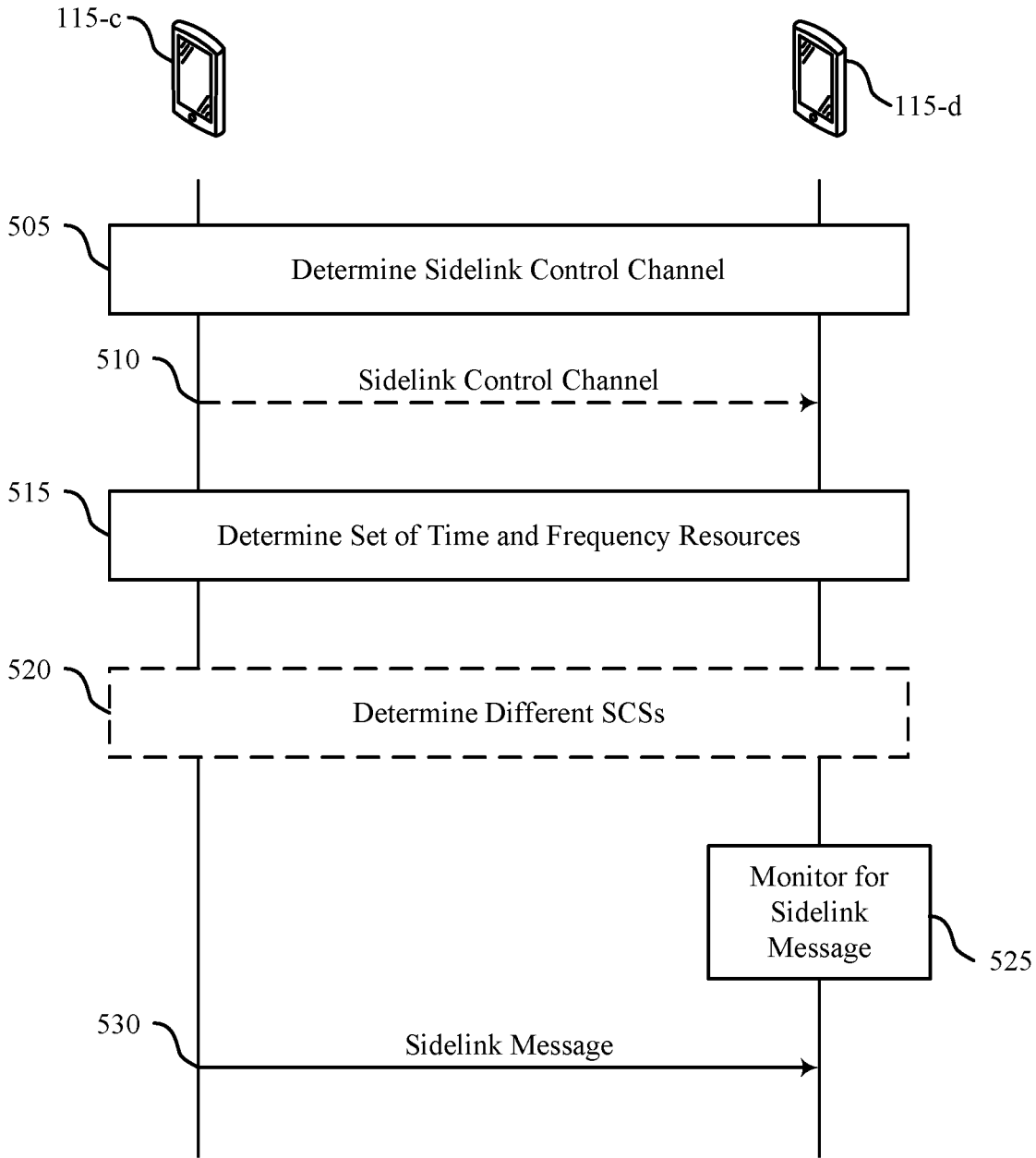
FIG. 5 illustrates an example of a process flow that supports sidelink communications using a sidelink resource pool configured for a different RAT in accordance with aspects of the present disclosure.

FIG. 5 illustrates an example of a process flow 500 that supports sidelink communications using a sidelink resource pool configured for a different radio access technology in accordance with aspects of the present disclosure. In some examples, process flow 500 may implement aspects of wireless communications systems 100 and 200. For example, process flow 500 may include a UE 115-c and a UE 115-d, which may represent examples of corresponding UEs 115 as described with reference to FIGS. 1-4. Additionally, or alternatively, the UE 115-c and the UE 115-d may support sidelink communications with each other.

In the following description of the process flow 500, the operations between the UE 115-c and the UE 115-d may be performed in different orders or at different times. Some operations may also be left out of the process flow 500, or other operations may be added to the process flow 500. It is to be understood that while the UE 115-c and the UE 115-d are shown performing a number of the operations of process flow 500, any wireless device may perform the operations shown.

At 505, the UE 115-*c* and the UE 115-*d* may determine a sidelink control channel (e.g., a PSCCH) configured for a first RAT (e.g., LTE). For example, in some implementations, the UE 115-*c* may receive the sidelink control channel.

At 510, the UE 115-*d* may receive a first sidelink message in the sidelink control channel configured for the first RAT. For example, the UE 115-*c* (e.g., or another UE 115) may transmit the first sidelink message in the sidelink control channel to the UE 115-*d*.

At 515, the UE 115-*c* and the UE 115-*d* may determine a set of time and frequency resources indicated by the first sidelink message communicated in the sidelink control channel. In some implementations, the first sidelink message in the sidelink control channel may include a field indicating that the set of time and frequency resources may be associated with a second RAT (e.g., different than the first RAT, such as NR). Additionally, or alternatively, the first sidelink message in the sidelink control channel may be transmitted as part of an SPS process, and an additional sidelink message may be transmitted with the sidelink control channel as part of the SPS process, where the additional sidelink message indicates that the set of time and frequency resources are associated with the second RAT. In some implementations, the set of time and frequency resource may include time and frequency resources for a sidelink feedback channel (e.g., a PSFCH) associated with the second RAT.

At 520, the UE 115-*c* and the UE 115-*d* may determine a first SCS associated with the first RAT is different than a second SCS associated with the second RAT, where multiple TTIs associated with the second RAT overlap with a single TTI for the sidelink control channel based on the first SCS being different than the second SCS. In some implementations, one or more of the multiple TTIs after a first TTI may be available for use by additional devices operating in the second RAT.

At 525, the UE 115-*d* may monitor for a second sidelink message associated with the second RAT on the set of time and frequency resources, the second RAT being different than the first RAT. If the SCSs are different for the first and second RAT, respectively, the UE 115-*d* may monitor for the second sidelink message in a first TTI of the multiple TTIs. In some implementations, the UE 115-*d* may monitor for a retransmission of the second sidelink message in one or more remaining TTIs of the multiple TTIs after the first TTI. Additionally, or alternatively, the UE 115-*d* may determine the second sidelink message includes a TB that spans two or more TTIs of the multiple TTIs and may monitor for the TB in each of the two or more TTIs. In some implementation, the UE 115-*d* may determine the second sidelink message is transmitted in two or more TTIs of the multiple TTIs and may monitor for the second sidelink message in each of the two or more TTIs, where the UE 115-*d* may combine each received instance of the sidelink message from the two or more TTIs. For example, the second sidelink message may be transmitted in the two or more TTIs based on an RV cycling configuration.

At 530, the UE 115-*c* may transmit, on the set of time and frequency resources, the second sidelink message associated with the second RAT (e.g., in a first TTI of multiple TTIs, with retransmissions, using a TB that spans multiple TTIs, different instances in respective TTIs using the RV cycling configuration, etc.). In some implementations, the UE 115-*c* (e.g., a same transmitting device) may transmit both the first sidelink message in the sidelink control channel and the second sidelink message. Alternatively, a different UE 115 (e.g., a first transmitting device) may transmit the first sidelink message in the sidelink control channel, and the UE 115-*c* (e.g., a second transmitting device) may transmit the second sidelink message on the set of time and frequency resources indicated by the first sidelink message communicated in the sidelink control channel transmitted by the different UE 115.

Figure 6:
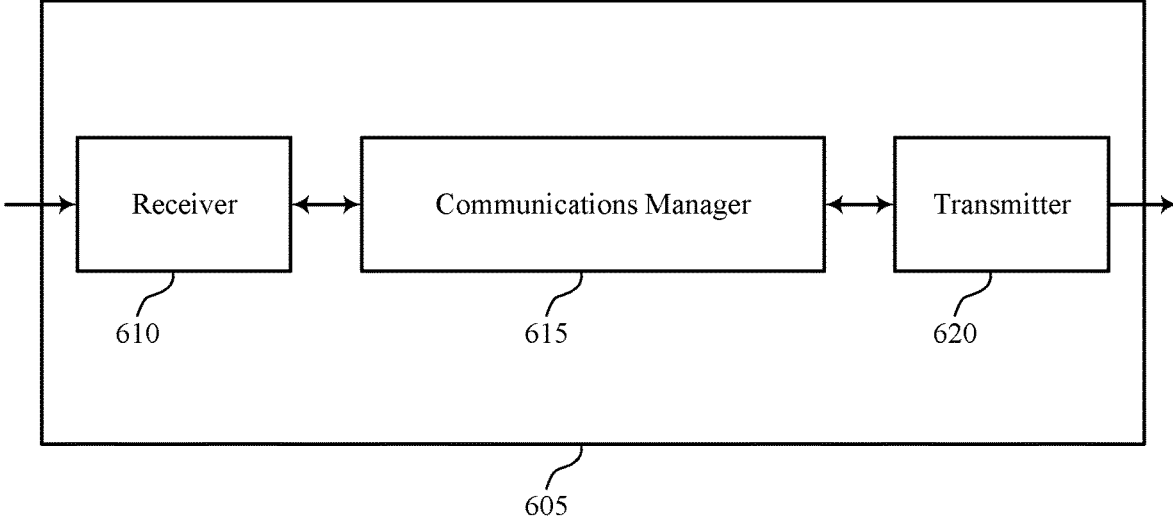
FIGS. 6 and 7 show block diagrams of devices that support sidelink communications using a sidelink resource pool configured for a different radio access technology in accordance with aspects of the present disclosure.

FIG. 6 shows a block diagram 600 of a device 605 that supports sidelink communications using a sidelink resource pool configured for a different RAT in accordance with aspects of the present disclosure. The device 605 may be an example of aspects of a UE 115 as described herein. Additionally, or alternatively, in some implementations, the device 605 may operate as a receiving device, as a transmitting device, or as both a receiving and transmitting device. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to sidelink communications using a sidelink resource pool configured for a different RAT, etc.). Information may be passed on to other components of the device 605. The receiver 610 may be an example of aspects of the transceiver 920 described with reference to FIG. 9. The receiver 610 may utilize a single antenna or a set of antennas.

When the device 605 is operating as a receiving device (e.g., or a device that both transmits and receives), the communications manager 615 may receive a first sidelink message in a sidelink control channel configured for a first RAT. In some implementations, the communications manager 615 may determine a set of time and frequency resources indicated by the first sidelink message received in the sidelink control channel. Subsequently, the communications manager 615 may monitor, on the set of time and frequency resources, for a second sidelink message associated with a second RAT, the second RAT being different than the first RAT.

When the device 605 is operating as a transmitting device (e.g., or a device that both transmits and receives), the communications manager 615 may determine a sidelink control channel configured for a first RAT. Additionally, or alternatively, the communications manager 615 may determine a set of time and frequency resources indicated by a first sidelink message in the sidelink control channel. Subsequently, the communications manager 615 may transmit, on the set of time and frequency resources, a second sidelink message associated with a second RAT, the second RAT being different than the first RAT. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to more efficiently use sidelink resources for communications with a second device. For example, rather than having resources configured and used for a single RAT, the device 605 may use resources initially associated with a first RAT for communications associated with a second RAT. As such, these resources that would have otherwise been unused potentially for the first RAT may now be used for the communications associated with the second RAT, resulting in a more efficient usage of resources.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
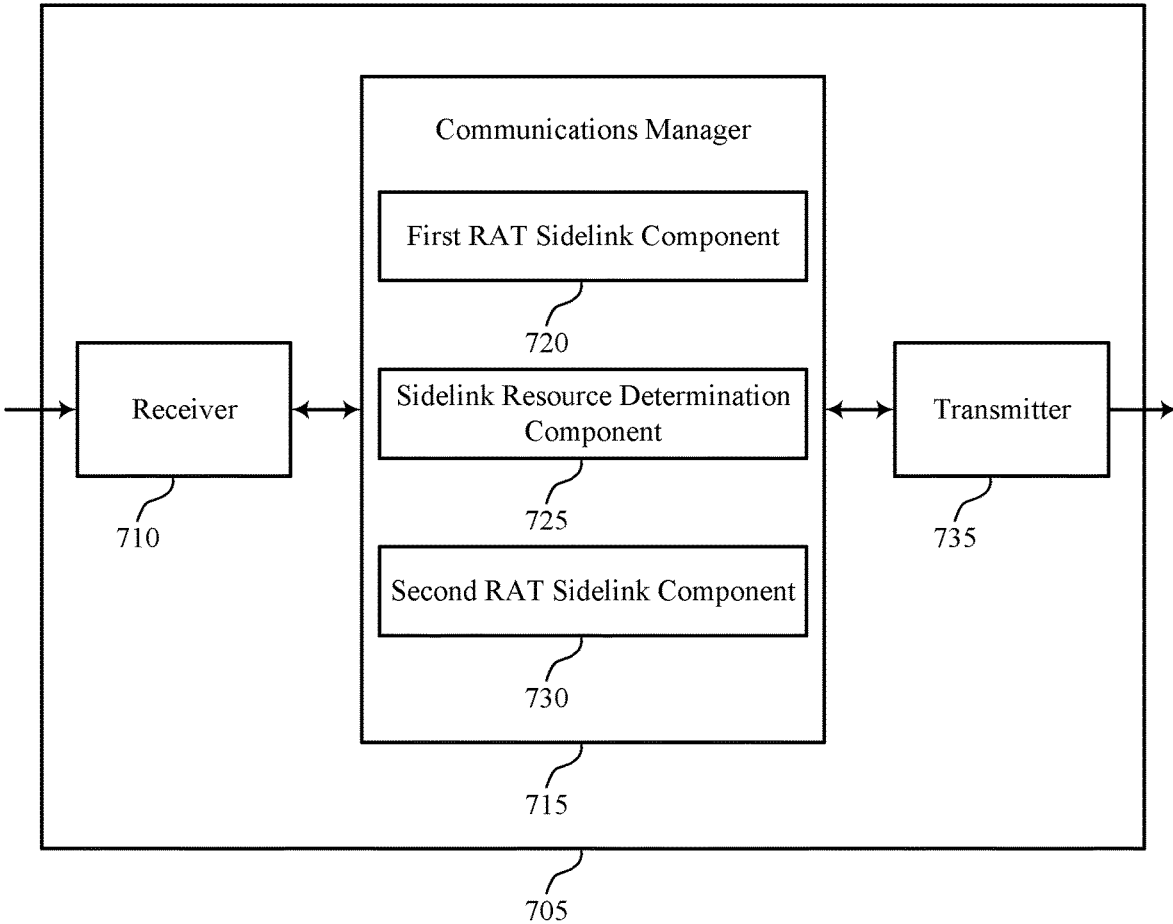

FIG. 7 shows a block diagram 700 of a device 705 that supports sidelink communications using a sidelink resource pool configured for a different RAT in accordance with aspects of the present disclosure. The device 705 may be an example of aspects of a device 605, or a UE 115 as described herein. Additionally, or alternatively, in some implementations, the device 705 may operate as a receiving device, as a transmitting device, or as both a receiving and transmitting device. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to sidelink communications using a sidelink resource pool configured for a different RAT, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a first RAT sidelink component 720, a sidelink resource determination component 725, and a second RAT sidelink component 730. The communications manager 715 may be an example of aspects of the communications manager 910 described herein.

When the device 705 is operating as the receiving device (e.g., or a device that both receives and transmits), the first RAT sidelink component 720 may receive a first sidelink message in a sidelink control channel configured for a first RAT.

When the device 705 is operating as the receiving device, the sidelink resource determination component 725 may determine a set of time and frequency resources indicated by the first sidelink message received in the sidelink control channel.

When the device 705 is operating as the receiving device, the second RAT sidelink component 730 may monitor, on the set of time and frequency resources, for a second sidelink message associated with a second RAT, the second RAT being different than the first RAT.

When the device 705 is operating as the transmitting device (e.g., or a device that both receives and transmits), the first RAT sidelink component 720 may determine a sidelink control channel configured for a first RAT.

When the device 705 is operating as the transmitting device, the sidelink resource determination component 725 may determine a set of time and frequency resources indicated by a first sidelink message in the sidelink control channel.

When the device 705 is operating as the transmitting device, the second RAT sidelink component 730 may transmit, on the set of time and frequency resources, a second sidelink message associated with a second RAT, the second RAT being different than the first RAT.

Based on using a set of time and frequency resources initially configured for a first RAT to communicate a sidelink message associated with a second RAT as described herein, a processor of a UE 115 (e.g., controlling the receiver 710, the transmitter 735, or the transceiver 920 as described with reference to FIG. 9) may decrease signaling complexity and overhead and decrease latency. For example, rather than determining a set of time and frequency resources reserved specifically for the second RAT, the processor may utilize the set of time and frequency resources initially associated with the first RAT to communicate a sidelink message associated with the second RAT, thereby reducing signaling used to determine the specific set of time and frequency resources for the second RAT and being able to communicate the sidelink message with less latency.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
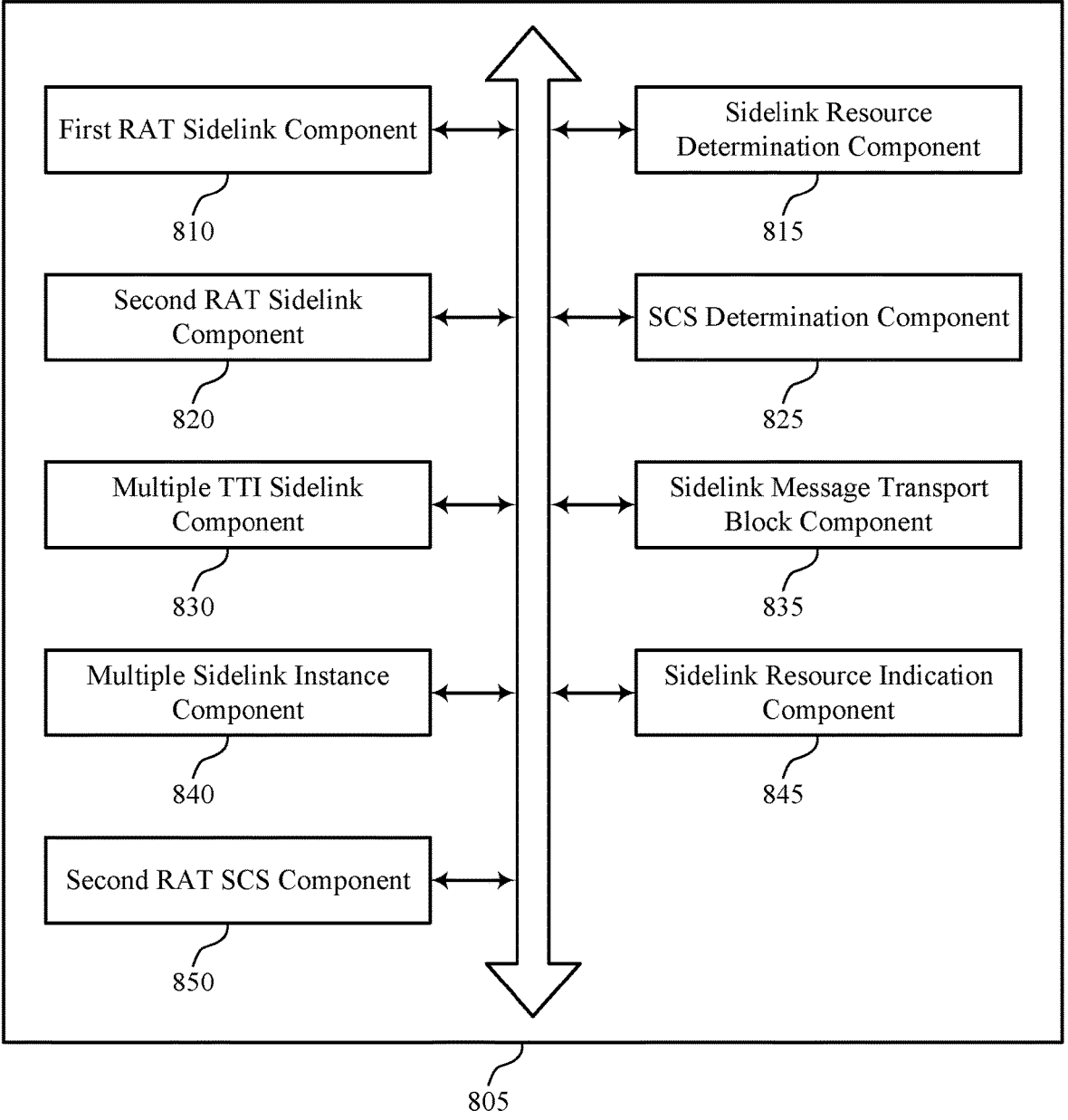
FIG. 8 shows a block diagram of a communications manager that supports sidelink communications using a sidelink resource pool configured for a different radio access technology in accordance with aspects of the present disclosure.

FIG. 8 shows a block diagram 800 of a communications manager 805 that supports sidelink communications using a sidelink resource pool configured for a different RAT in accordance with aspects of the present disclosure. In some implementations, the communications manager 805 may be part of a receiving device or a transmitting device in the context as described herein. The communications manager 805 may be an example of aspects of a communications manager 615, a communications manager 715, or a communications manager 910 described herein. The communications manager 805 may include a first RAT sidelink component 810, a sidelink resource determination component 815, a second RAT sidelink component 820, a SCS determination component 825, a multiple TTI sidelink component 830, a sidelink message transport block component 835, a multiple sidelink instance component 840, a sidelink resource indication component 845, and a second RAT SCS component 850. Each of these modules may communicate, directly or indirectly, with one another (e.g., via one or more buses).

When the communications manager 805 is part of a receiving device, the first RAT sidelink component 810 may receive a first sidelink message in a sidelink control channel configured for a first RAT. In some examples, the first RAT sidelink component 810 may receive the first sidelink message in the sidelink control channel from a first transmitting device.

When the communications manager 805 is part of a transmitting device, the first RAT sidelink component 810 may determine a sidelink control channel configured for a first RAT. In some implementations, the first RAT sidelink component 810 may transmit the first sidelink message in the sidelink control channel, the first sidelink message indicating the set of time and frequency resources. Alternatively, the first RAT sidelink component 810 may receive the first sidelink message in the sidelink control channel.

When the communications manager 805 is part of a receiving device, the sidelink resource determination component 815 may determine a set of time and frequency resources indicated by the first sidelink message received in the sidelink control channel. In some cases, the set of time and frequency resource may include time and frequency resources for a sidelink feedback channel associated with the second RAT.

When the communications manager 805 is part of a transmitting device, the sidelink resource determination component 815 may determine a set of time and frequency resources indicated by a first sidelink message in the sidelink control channel. In some cases, the set of time and frequency resource may include time and frequency resources for a sidelink feedback channel associated with the second RAT.

When the communications manager 805 is part of a receiving device, the second RAT sidelink component 820 may monitor, on the set of time and frequency resources, for a second sidelink message associated with a second RAT, the second RAT being different than the first RAT. In some examples, the second RAT sidelink component 820 may receive the first sidelink message in the sidelink control channel and the second sidelink message from a same transmitting device. Alternatively, the second RAT sidelink component 820 may receive the second sidelink message from a second transmitting device. In some cases, the first RAT may be LTE, and the second RAT may be NR.

When the communications manager 805 is part of a transmitting device, the second RAT sidelink component 820 may transmit, on the set of time and frequency resources, a second sidelink message associated with a second RAT, the second RAT being different than the first RAT. In some cases, the first RAT may be LTE, and the second RAT may be NR.

When the communications manager 805 is part of either a receiving device or a transmitting device, the SCS determination component 825 may determine a first SCS associated with the first RAT is different than a second SCS associated with the second RAT, where multiple TTIs configured for the second RAT overlap with a single TTI for the sidelink control channel based on the first SCS being different than the second SCS.

When the communications manager 805 is part of a receiving device, the multiple TTI sidelink component 830 may monitor for the second sidelink message in a first TTI of the multiple TTIs. In some examples, the multiple TTI sidelink component 830 may monitor for a retransmission of the second sidelink message in one or more remaining TTIs of the multiple TTIs after the first TTI. Additionally, or alternatively, one or more of the multiple TTIs after the first TTI are available for use by additional devices operating in the second RAT.

When the communications manager 805 is part of a receiving device, the sidelink message transport block component 835 may determine the second sidelink message includes a transport block that spans two or more TTIs of the multiple TTIs and may monitor for the transport block in each of the two or more TTIs.

When the communications manager 805 is part of a transmitting device, the sidelink message transport block component 835 may determine the second sidelink message includes a transport block that spans two or more TTIs of the multiple TTIs and may transmit the transport block in each of the two or more TTIs.

When the communications manager 805 is part of a receiving device, the multiple sidelink instance component 840 may determine the second sidelink message is transmitted in two or more TTIs of the multiple TTIs and may monitor for the second sidelink message in each of the two or more TTIs, where the receiving device may combine each received instance of the sidelink message from the two or more TTIs. In some cases, the second sidelink message may be transmitted in the two or more TTIs based on a RV cycling configuration.

When the communications manager 805 is part of a receiving device, the sidelink resource indication component 845 may receive a field in the first sidelink message in the sidelink control channel indicating the set of time and frequency resources configured for the second RAT. Additionally, or alternatively, the sidelink resource indication component 845 may receive the first sidelink message in the sidelink control channel as part of a SPS process and may receive an additional sidelink message indicating the set of time and frequency resources available for the second sidelink message configured for the second RAT.

When the communications manager 805 is part of a transmitting device, the sidelink resource indication component 845 may transmit a field in the first sidelink message in the sidelink control channel indicating the set of time and frequency resources configured for the second RAT. Additionally, or alternatively, the sidelink resource indication component 845 may transmit the first sidelink message in the sidelink control channel as part of a SPS process and may transmit an additional sidelink message indicating the set of time and frequency resources available for the sidelink message configured for the second RAT.

When the communications manager 805 is part of a transmitting device, the second RAT SCS component 850 may transmit the second sidelink message in a first TTI of the multiple TTIs. In some examples, the second RAT SCS component 850 may transmit a retransmission of the second sidelink message in one or more remaining TTIs of the multiple TTIs after the first TTI. Additionally, or alternatively, the second RAT SCS component 850 may transmit the second sidelink message in two or more TTIs of the multiple TTIs. In some cases, one or more of the multiple TTIs after the first TTI may be available for use by additional devices operating in the second RAT.

Figure 9:
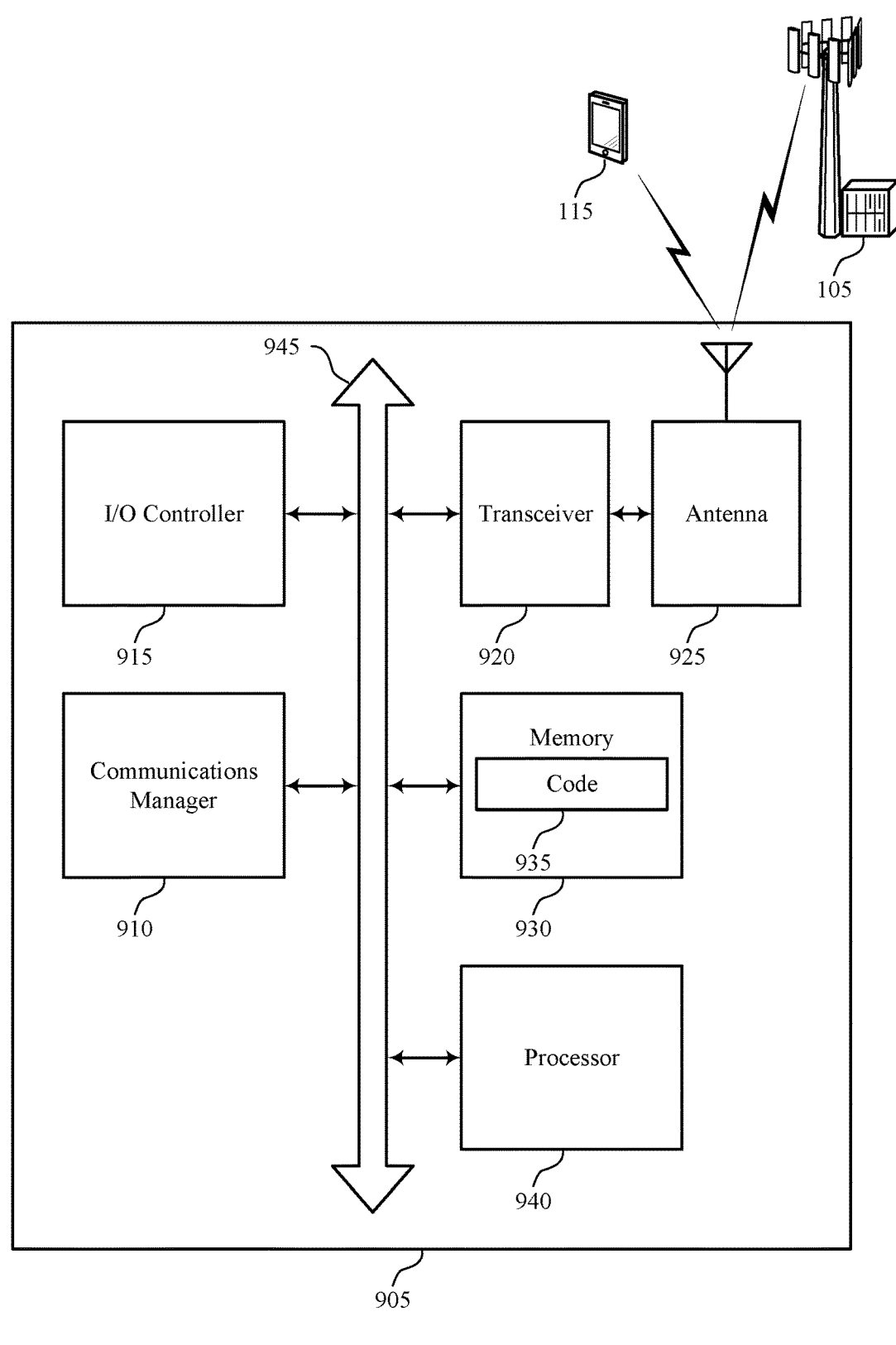
FIG. 9 shows a diagram of a system including a device that supports sidelink communications using a sidelink resource pool configured for a different radio access technology in accordance with aspects of the present disclosure.

FIG. 9 shows a diagram of a system 900 including a device 905 that supports sidelink communications using a sidelink resource pool configured for a different RAT in accordance with aspects of the present disclosure. The device 905 may be an example of or include the components of device 605, device 705, or a UE 115 as described herein. Additionally, or alternatively, in some implementations, the device 905 may operate as a receiving device, as a transmitting device, or as both a receiving and transmitting device. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

When the device 905 is operating as a receiving device (e.g., or a device that both transmits and receives), the communications manager 910 may receive a first sidelink message in a sidelink control channel configured for a first RAT. In some implementations, the communications manager 910 may determine a set of time and frequency resources indicated by the first sidelink message received in the sidelink control channel. Subsequently, the communications manager 910 may monitor, on the set of time and frequency resources, for a second sidelink message associated with a second RAT, the second RAT being different than the first RAT.

When the device 905 is operating as a transmitting device (e.g., or a device that both transmits and receives), the communications manager 910 may determine a sidelink control channel configured for a first RAT. Additionally, or alternatively, the communications manager 910 may determine a set of time and frequency resources indicated by a first sidelink message in the sidelink control channel. Subsequently, the communications manager 910 may transmit, on the set of time and frequency resources, a second sidelink message associated with a second RAT, the second RAT being different than the first RAT.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink communications using a sidelink resource pool configured for a different RAT).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

FIG. 10 shows a flowchart illustrating a method 1000 that supports sidelink communications using a sidelink resource pool configured for a different RAT in accordance with aspects of the present disclosure. The operations of method 1000 may be implemented by a UE 115, a receiving device, a receiving UE 115, or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1005, the UE may receive a first sidelink message in a sidelink control channel configured for a first RAT. The operations of 1005 may be performed according to the methods described herein. In some examples, aspects of the operations of 1005 may be performed by a first RAT sidelink component as described with reference to FIGS. 6 through 9.

At 1010, the UE may determine a set of time and frequency resources indicated by the first sidelink message received in the sidelink control channel. The operations of 1010 may be performed according to the methods described herein. In some examples, aspects of the operations of 1010 may be performed by a sidelink resource determination component as described with reference to FIGS. 6 through 9.

At 1015, the UE may monitor, on the set of time and frequency resources, for a second sidelink message associated with a second RAT, the second RAT being different than the first RAT. The operations of 1015 may be performed according to the methods described herein. In some examples, aspects of the operations of 1015 may be performed by a second RAT sidelink component as described with reference to FIGS. 6 through 9.

FIG. 11 shows a flowchart illustrating a method 1100 that supports sidelink communications using a sidelink resource pool configured for a different RAT in accordance with aspects of the present disclosure. The operations of method 1100 may be implemented by a UE 115, a receiving device, a receiving UE 115, or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1105, the UE may receive a first sidelink message in a sidelink control channel configured for a first RAT. The operations of 1105 may be performed according to the methods described herein. In some examples, aspects of the operations of 1105 may be performed by a first RAT sidelink component as described with reference to FIGS. 6 through 9.

At 1110, the UE may determine a set of time and frequency resources indicated by the first sidelink message received in the sidelink control channel. The operations of 1110 may be performed according to the methods described herein. In some examples, aspects of the operations of 1110 may be performed by a sidelink resource determination component as described with reference to FIGS. 6 through 9.

At 1115, the UE may monitor, on the set of time and frequency resources, for a second sidelink message associated with a second RAT, the second RAT being different than the first RAT. The operations of 1115 may be performed according to the methods described herein. In some examples, aspects of the operations of 1115 may be performed by a second RAT sidelink component as described with reference to FIGS. 6 through 9.

At 1120, the UE may determine a first SCS associated with the first RAT is different than a second SCS associated with the second RAT, where multiple TTIs configured for the second RAT overlap with a single TTI for the sidelink control channel based on the first SCS being different than the second SCS. The operations of 1120 may be performed according to the methods described herein. In some examples, aspects of the operations of 1120 may be performed by a SCS determination component as described with reference to FIGS. 6 through 9.

At 1125, the UE may monitor for the second sidelink message in a first TTI of the multiple TTIs. The operations of 1125 may be performed according to the methods described herein. In some examples, aspects of the operations of 1125 may be performed by a multiple TTI sidelink component as described with reference to FIGS. 6 through 9.

FIG. 12 shows a flowchart illustrating a method 1200 that supports sidelink communications using a sidelink resource pool configured for a different RAT in accordance with aspects of the present disclosure. The operations of method 1200 may be implemented by a UE 115, a receiving device, a receiving UE 115, or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1205, the UE may receive a first sidelink message in a sidelink control channel configured for a first RAT. The operations of 1205 may be performed according to the methods described herein. In some examples, aspects of the operations of 1205 may be performed by a first RAT sidelink component as described with reference to FIGS. 6 through 9.

At 1210, the UE may determine a set of time and frequency resources indicated by the first sidelink message received in the sidelink control channel. The operations of 1210 may be performed according to the methods described herein. In some examples, aspects of the operations of 1210 may be performed by a sidelink resource determination component as described with reference to FIGS. 6 through 9.

At 1215, the UE may receive a field in the first sidelink message in the sidelink control channel indicating the set of time and frequency resources configured for the second RAT. The operations of 1215 may be performed according to the methods described herein. In some examples, aspects of the operations of 1215 may be performed by a sidelink resource indication component as described with reference to FIGS. 6 through 9.

At 1220, the UE may monitor, on the set of time and frequency resources, for a second sidelink message associated with a second RAT, the second RAT being different than the first RAT. The operations of 1220 may be performed according to the methods described herein. In some examples, aspects of the operations of 1220 may be performed by a second RAT sidelink component as described with reference to FIGS. 6 through 9.

FIG. 13 shows a flowchart illustrating a method 1300 that supports sidelink communications using a sidelink resource pool configured for a different RAT in accordance with aspects of the present disclosure. The operations of method 1300 may be implemented by a UE 115, a receiving device, a receiving UE 115, or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1305, the UE may receive a first sidelink message in a sidelink control channel configured for a first RAT. The operations of 1305 may be performed according to the methods described herein. In some examples, aspects of the operations of 1305 may be performed by a first RAT sidelink component as described with reference to FIGS. 6 through 9.

At 1310, the UE may receive the first sidelink message in the sidelink control channel as part of a SPS process. The operations of 1310 may be performed according to the methods described herein. In some examples, aspects of the operations of 1310 may be performed by a sidelink resource indication component as described with reference to FIGS. 6 through 9.

At 1315, the UE may determine a set of time and frequency resources indicated by the first sidelink message received in the sidelink control channel. The operations of 1315 may be performed according to the methods described herein. In some examples, aspects of the operations of 1315 may be performed by a sidelink resource determination component as described with reference to FIGS. 6 through 9.

At 1320, the UE may receive an additional sidelink message indicating the set of time and frequency resources available for the second sidelink message configured for the second RAT. The operations of 1320 may be performed according to the methods described herein. In some examples, aspects of the operations of 1320 may be performed by a sidelink resource indication component as described with reference to FIGS. 6 through 9.

At 1325, the UE may monitor, on the set of time and frequency resources, for a second sidelink message associated with a second RAT, the second RAT being different than the first RAT. The operations of 1325 may be performed according to the methods described herein. In some examples, aspects of the operations of 1325 may be performed by a second RAT sidelink component as described with reference to FIGS. 6 through 9.

Figure 14:
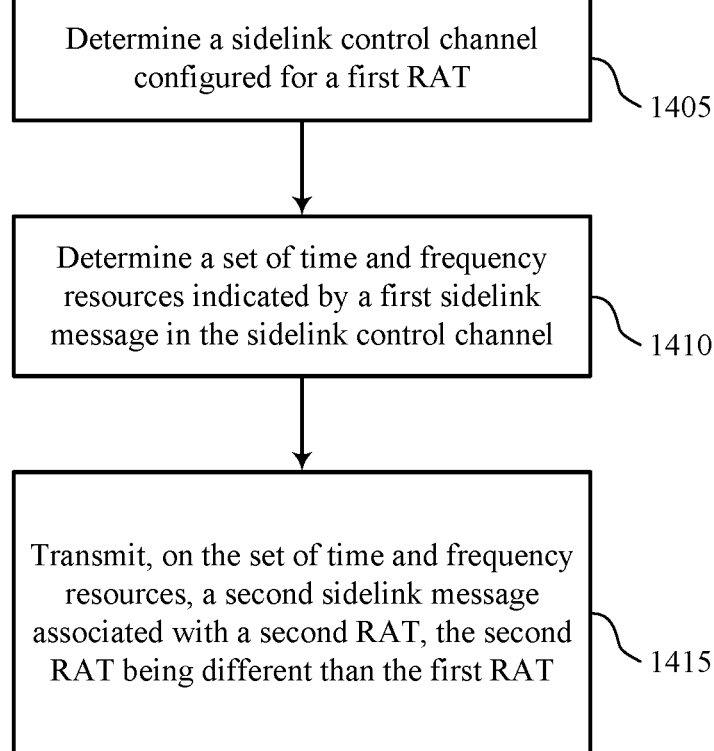

FIG. 14 shows a flowchart illustrating a method 1400 that supports sidelink communications using a sidelink resource pool configured for a different RAT in accordance with aspects of the present disclosure. The operations of method 1400 may be implemented by a UE 115, a transmitting device, a transmitting UE 115, or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1405, the UE may determine a sidelink control channel configured for a first RAT. The operations of 1405 may be performed according to the methods described herein. In some examples, aspects of the operations of 1405 may be performed by a first RAT sidelink component as described with reference to FIGS. 6 through 9.

At 1410, the UE may determine a set of time and frequency resources indicated by a first sidelink message in the sidelink control channel. The operations of 1410 may be performed according to the methods described herein. In some examples, aspects of the operations of 1410 may be performed by a sidelink resource determination component as described with reference to FIGS. 6 through 9.

At 1415, the UE may transmit, on the set of time and frequency resources, a second sidelink message associated with a second RAT, the second RAT being different than the first RAT. The operations of 1415 may be performed according to the methods described herein. In some examples, aspects of the operations of 1415 may be performed by a second RAT sidelink component as described with reference to FIGS. 6 through 9.

FIG. 15 shows a flowchart illustrating a method 1500 that supports sidelink communications using a sidelink resource pool configured for a different RAT in accordance with aspects of the present disclosure. The operations of method 1500 may be implemented by a UE 115, a transmitting device, a transmitting UE 115, or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1505, the UE may determine a sidelink control channel configured for a first RAT. The operations of 1505 may be performed according to the methods described herein. In some examples, aspects of the operations of 1505 may be performed by a first RAT sidelink component as described with reference to FIGS. 6 through 9.

At 1510, the UE may determine a set of time and frequency resources indicated by a first sidelink message in the sidelink control channel. The operations of 1510 may be performed according to the methods described herein. In some examples, aspects of the operations of 1510 may be performed by a sidelink resource determination component as described with reference to FIGS. 6 through 9.

At 1515, the UE may transmit the first sidelink message in the sidelink control channel, the first sidelink message indicating the set of time and frequency resources. The operations of 1515 may be performed according to the methods described herein. In some examples, aspects of the operations of 1515 may be performed by a first RAT sidelink component as described with reference to FIGS. 6 through 9.

At 1520, the UE may transmit, on the set of time and frequency resources, a second sidelink message associated with a second RAT, the second RAT being different than the first RAT. The operations of 1520 may be performed according to the methods described herein. In some examples, aspects of the operations of 1520 may be performed by a second RAT sidelink component as described with reference to FIGS. 6 through 9.

FIG. 16 shows a flowchart illustrating a method 1600 that supports sidelink communications using a sidelink resource pool configured for a different RAT in accordance with aspects of the present disclosure. The operations of method 1600 may be implemented by a UE 115, a transmitting device, a transmitting UE 115, or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1605, the UE may receive the first sidelink message in the sidelink control channel. The operations of 1605 may be performed according to the methods described herein. In some examples, aspects of the operations of 1605 may be performed by a first RAT sidelink component as described with reference to FIGS. 6 through 9.

At 1610, the UE may determine a sidelink control channel configured for a first RAT. The operations of 1610 may be performed according to the methods described herein. In some examples, aspects of the operations of 1610 may be performed by a first RAT sidelink component as described with reference to FIGS. 6 through 9.

At 1615, the UE may determine a set of time and frequency resources indicated by a first sidelink message in the sidelink control channel. The operations of 1615 may be performed according to the methods described herein. In some examples, aspects of the operations of 1615 may be performed by a sidelink resource determination component as described with reference to FIGS. 6 through 9.

At 1620, the UE may transmit, on the set of time and frequency resources, a second sidelink message associated with a second RAT, the second RAT being different than the first RAT. The operations of 1620 may be performed according to the methods described herein. In some examples, aspects of the operations of 1620 may be performed by a second RAT sidelink component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a receiving device, comprising: receiving a first sidelink message in a sidelink control channel configured for a first radio access technology; determining a set of time and frequency resources indicated by the first sidelink message received in the sidelink control channel; and monitoring, on the set of time and frequency resources, for a second sidelink message associated with a second radio access technology, the second radio access technology being different than the first radio access technology.

Aspect 2: The method of aspect 1, further comprising: determining a first subcarrier spacing associated with the first radio access technology is different than a second subcarrier spacing associated with the second radio access technology, wherein multiple transmission time intervals configured for the second radio access technology overlap with a single transmission time interval for the sidelink control channel based at least in part on the first subcarrier spacing being different than the second subcarrier spacing.

Aspect 3: The method of aspect 2, wherein monitoring for the second sidelink message comprises: monitoring for the second sidelink message in a first transmission time interval of the multiple transmission time intervals.

Aspect 4: The method of aspect 3, further comprising: monitoring for a retransmission of the second sidelink message in one or more remaining transmission time intervals of the multiple transmission time intervals after the first transmission time interval.

Aspect 5: The method of any of aspects 3 through 4, wherein one or more of the multiple transmission time intervals after the first transmission time interval are available for use by additional devices operating in the second radio access technology.

Aspect 6: The method of any of aspects 2 through 5, further comprising: determining the second sidelink message comprises a transport block that spans two or more transmission time intervals of the multiple transmission time intervals; and monitoring for the transport block in each of the two or more transmission time intervals.

Aspect 7: The method of any of aspects 2 through 6, further comprising: determining the second sidelink message is transmitted in two or more transmission time intervals of the multiple transmission time intervals; and monitoring for the second sidelink message in each of the two or more transmission time intervals, wherein the receiving device combines each received instance of the sidelink message from the two or more transmission time intervals.

Aspect 8: The method of aspect 7, wherein the second sidelink message is transmitted in the two or more transmission time intervals based at least in part on a redundancy version cycling configuration.

Aspect 9: The method of any of aspects 1 through 8, further comprising: receiving the first sidelink message in the sidelink control channel and the second sidelink message from a same transmitting device.

Aspect 10: The method of any of aspects 1 through 9, further comprising: receiving the first sidelink message in the sidelink control channel from a first transmitting device; and receiving the second sidelink message from a second transmitting device.

Aspect 11: The method of any of aspects 1 through 10, wherein receiving the first sidelink message in the sidelink control channel comprises: receiving a field in the first sidelink message in the sidelink control channel indicating the set of time and frequency resources configured for the second radio access technology.

Aspect 12: The method of any of aspects 1 through 11, wherein receiving the first sidelink message in the sidelink control channel comprises: receiving the first sidelink message in the sidelink control channel as part of a semi-persistent scheduling process; and receiving an additional sidelink message indicating the set of time and frequency resources available for the second sidelink message configured for the second radio access technology.

Aspect 13: The method of any of aspects 1 through 12, wherein the set of time and frequency resource comprise time and frequency resources for a sidelink feedback channel associated with the second radio access technology.

Aspect 14: The method of any of aspects 1 through 13, wherein the first radio access technology comprises Long-Term Evolution, and the second radio access technology comprises New Radio.

Aspect 15: A method for wireless communications at a transmitting device, comprising: determining a sidelink control channel configured for a first radio access technology; determining a set of time and frequency resources indicated by a first sidelink message in the sidelink control channel; and transmitting, on the set of time and frequency resources, a second sidelink message associated with a second radio access technology, the second radio access technology being different than the first radio access technology.

Aspect 16: The method of aspect 15, further comprising: determining a first subcarrier spacing associated with the first radio access technology is different than a second subcarrier spacing associated with the second radio access technology, wherein multiple transmission time intervals associated with the second radio access technology overlap with a single transmission time interval for the sidelink control channel based at least in part on the first subcarrier spacing being different than the second subcarrier spacing.

Aspect 17: The method of aspect 16, wherein transmitting the second sidelink message comprises: transmitting the second sidelink message in a first transmission time interval of the multiple transmission time intervals.

Aspect 18: The method of aspect 17, further comprising: transmitting a retransmission of the second sidelink message in one or more remaining transmission time intervals of the multiple transmission time intervals after the first transmission time interval.

Aspect 19: The method of any of aspects 17 through 18, wherein one or more of the multiple transmission time intervals after the first transmission time interval are available for use by additional devices operating in the second radio access technology.

Aspect 20: The method of any of aspects 16 through 19, further comprising: determining the second sidelink message comprises a transport block that spans two or more transmission time intervals of the multiple transmission time intervals; and transmitting the transport block in each of the two or more transmission time intervals.

Aspect 21: The method of any of aspects 16 through 20, further comprising: transmitting the second sidelink message in two or more transmission time intervals of the multiple transmission time intervals.

Aspect 22: The method of any of aspects 15 through 21, further comprising: transmitting the first sidelink message in the sidelink control channel, the first sidelink message indicating the set of time and frequency resources.

Aspect 23: The method of aspect 22, wherein transmitting the first sidelink message in the sidelink control channel comprises: transmitting a field in the first sidelink message in the sidelink control channel indicating the set of time and frequency resources configured for the second radio access technology.

Aspect 24: The method of any of aspects 22 through 23, wherein transmitting the first sidelink message in the sidelink control channel comprises: transmitting the first sidelink message in the sidelink control channel as part of a semi-persistent scheduling process; and transmitting an additional sidelink message indicating the set of time and frequency resources available for the sidelink message configured for the second radio access technology.

Aspect 25: The method of any of aspects 15 through 24, further comprising: receiving the first sidelink message in the sidelink control channel.

Aspect 26: The method of any of aspects 15 through 25, wherein the set of time and frequency resource comprise time and frequency resources for a sidelink feedback channel associated with the second radio access technology.

Aspect 27: The method of any of aspects 15 through 26, wherein the first radio access technology comprises Long-Term Evolution, and the second radio access technology comprises New Radio.

Aspect 28: An apparatus for wireless communications at a receiving device, comprising a processor; memory coupled with the processor; and instructions stored in the memory and executable by the processor to cause the apparatus to perform a method of any of aspects 1 through 14.

Aspect 29: An apparatus for wireless communications at a receiving device, comprising at least one means for performing a method of any of aspects 1 through 14.

Aspect 30: A non-transitory computer-readable medium storing code for wireless communications at a receiving device, the code comprising instructions executable by a processor to perform a method of any of aspects 1 through 14.

Aspect 31: An apparatus for wireless communications at a transmitting device, comprising a processor; memory coupled with the processor; and instructions stored in the memory and executable by the processor to cause the apparatus to perform a method of any of aspects 15 through 27.

Aspect 32: An apparatus for wireless communications at a transmitting device, comprising at least one means for performing a method of any of aspects 15 through 27.

Aspect 33: A non-transitory computer-readable medium storing code for wireless communications at a transmitting device, the code comprising instructions executable by a processor to perform a method of any of aspects 15 through 27.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is prop-erly termed a computer-readable medium. For example, if the software is transmitted from a website, server, or other remote source using a coaxial cable, fiber optic cable, twisted pair, digital subscriber line (DSL), or wireless tech-nologies such as infrared, radio, and microwave, then the coaxial cable, fiber optic cable, twisted pair, DSL, or wire-less technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various com-ponents of the same type may be distinguished by following the reference label by a dash and a second label that distinguishes among the similar components. If just the first reference label is used in the specification, the description is applicable to any one of the similar components having the same first reference label irrespective of the second refer-ence label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advanta-geous over other examples." The detailed description includes specific details for the purpose of providing an understanding of the described techniques. These tech-niques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a receiving device, comprising:
receiving a first sidelink message in a sidelink control channel configured for a first radio access technology;
determining a set of time and frequency resources indi-cated by the first sidelink message received in the sidelink control channel, wherein the set of time and frequency resources are configured for sidelink com-munications of a second radio access technology that is different than the first radio access technology used to receive the first sidelink message, and wherein multiple transmission time intervals configured for the second radio access technology overlap with a single transmis-sion time interval for the sidelink control channel; and
monitoring, on the set of time and frequency resources in a first transmission time interval of the multiple trans-mission time intervals, for a second sidelink message associated with the second radio access technology, wherein one or more of the multiple transmission time intervals after the first transmission time interval are available for a retransmission of the second sidelink message, for other transmissions using the second radio access technology, or both.

2. The method of claim 1, further comprising:
determining a first subcarrier spacing associated with the first radio access technology is different than a second subcarrier spacing associated with the second radio access technology, wherein the multiple transmission time intervals configured for the second radio access technology overlap with the single transmission time interval for the sidelink control channel based at least in part on the first subcarrier spacing being different than the second subcarrier spacing.

3. The method of claim 1, further comprising:
monitoring for the retransmission of the second sidelink message in one or more remaining transmission time intervals of the multiple transmission time intervals after the first transmission time interval.

4. The method of claim 1, further comprising:
determining the second sidelink message comprises a transport block that spans two or more transmission time intervals of the multiple transmission time inter-vals; and
monitoring for the transport block in each of the two or more transmission time intervals.

5. The method of claim 1, further comprising:
determining the second sidelink message is transmitted in two or more transmission time intervals of the multiple transmission time intervals; and
monitoring for the second sidelink message in each of the two or more transmission time intervals, wherein the receiving device combines each received instance of the second sidelink message from the two or more transmission time intervals.

6. The method of claim 5, wherein the second sidelink message is transmitted in the two or more transmission time intervals based at least in part on a redundancy version cycling configuration.

7. The method of claim 1, further comprising:
receiving the first sidelink message in the sidelink control channel and the second sidelink message from a same transmitting device.

8. The method of claim 1, further comprising:
receiving the first sidelink message in the sidelink control channel from a first transmitting device; and
receiving the second sidelink message from a second transmitting device.

9. The method of claim 1, wherein receiving the first sidelink message in the sidelink control channel comprises:

receiving a field in the first sidelink message in the sidelink control channel indicating the set of time and frequency resources configured for the second radio access technology.

10. The method of claim 1, wherein receiving the first sidelink message in the sidelink control channel comprises:
receiving the first sidelink message in the sidelink control channel as part of a semi-persistent scheduling process; and
receiving an additional sidelink message indicating the set of time and frequency resources available for the second sidelink message configured for the second radio access technology.

11. The method of claim 1, wherein the set of time and frequency resources comprise time and frequency resources for a sidelink feedback channel associated with the second radio access technology.

12. The method of claim 1, wherein the first radio access technology comprises Long-Term Evolution, and the second radio access technology comprises New Radio.

13. A method for wireless communications at a transmitting device, comprising:
determining a sidelink control channel configured for a first radio access technology;
determining a set of time and frequency resources indicated by a first sidelink message in the sidelink control channel, wherein the set of time and frequency resources are configured for sidelink communications of a second radio access technology that is different than the first radio access technology used to transmit the first sidelink message, and wherein multiple transmission time intervals configured for the second radio access technology overlap with a single transmission time interval for the sidelink control channel; and
transmitting, on the set of time and frequency resources in a first transmission time interval of the multiple transmission time intervals, a second sidelink message associated with the second radio access technology, wherein one or more of the multiple transmission time intervals after the first transmission time interval are available for a retransmission of the second sidelink message, for other transmissions using the second radio access technology, or both.

14. The method of claim 13, further comprising:
determining a first subcarrier spacing associated with the first radio access technology is different than a second subcarrier spacing associated with the second radio access technology, wherein the multiple transmission time intervals associated with the second radio access technology overlap with the single transmission time interval for the sidelink control channel based at least in part on the first subcarrier spacing being different than the second subcarrier spacing.

15. The method of claim 13, further comprising:
transmitting the retransmission of the second sidelink message in one or more remaining transmission time intervals of the multiple transmission time intervals after the first transmission time interval.

16. The method of claim 13, further comprising:
determining the second sidelink message comprises a transport block that spans two or more transmission time intervals of the multiple transmission time intervals; and
transmitting the transport block in each of the two or more transmission time intervals.

17. The method of claim 13, further comprising:
transmitting the second sidelink message in two or more transmission time intervals of the multiple transmission time intervals.

18. The method of claim 13, further comprising:
transmitting the first sidelink message in the sidelink control channel, the first sidelink message indicating the set of time and frequency resources.

19. The method of claim 18, wherein transmitting the first sidelink message in the sidelink control channel comprises:
transmitting a field in the first sidelink message in the sidelink control channel indicating the set of time and frequency resources configured for the second radio access technology.

20. The method of claim 18, wherein transmitting the first sidelink message in the sidelink control channel comprises:
transmitting the first sidelink message in the sidelink control channel as part of a semi-persistent scheduling process; and
transmitting an additional sidelink message indicating the set of time and frequency resources available for the second sidelink message configured for the second radio access technology.

21. The method of claim 13, further comprising:
receiving the first sidelink message in the sidelink control channel.

22. The method of claim 13, wherein the set of time and frequency resources comprise time and frequency resources for a sidelink feedback channel associated with the second radio access technology.

23. The method of claim 13, wherein the first radio access technology comprises Long-Term Evolution, and the second radio access technology comprises New Radio.

24. An apparatus for wireless communications at a receiving device, comprising:
one or more processors,
one or more memories coupled with the one or more processors; and
instructions stored in the one or more memories and executable by the one or more processors to cause the apparatus to:
receive a first sidelink message in a sidelink control channel configured for a first radio access technology;
determine a set of time and frequency resources indicated by the first sidelink message received in the sidelink control channel, wherein the set of time and frequency resources are configured for sidelink communications of a second radio access technology that is different than the first radio access technology used to receive the first sidelink message, and wherein multiple transmission time intervals configured for the second radio access technology overlap with a single transmission time interval for the sidelink control channel; and
monitor, on the set of time and frequency resources in a first transmission time interval of the multiple transmission time intervals, for a second sidelink message associated with the second radio access technology, wherein one or more of the multiple transmission time intervals after the first transmission time interval are available for a retransmission of the second sidelink message, for other transmissions using the second radio access technology, or both.

25. The apparatus of claim 24, wherein the instructions are further executable by the one or more processors to cause the apparatus to:

determine a first subcarrier spacing associated with the first radio access technology is different than a second subcarrier spacing associated with the second radio access technology, wherein the multiple transmission time intervals configured for the second radio access technology overlap with the single transmission time interval for the sidelink control channel based at least in part on the first subcarrier spacing being different than the second subcarrier spacing.

26. An apparatus for wireless communications at a transmitting device, comprising:

one or more processors, one or more memories coupled with the one or more processors; and instructions stored in the one or more memories and executable by the one or more processors to cause the apparatus to:

determine a sidelink control channel configured for a first radio access technology;

determine a set of time and frequency resources indicated by a first sidelink message in the sidelink control channel, wherein the set of time and frequency resources are configured for sidelink communications of a second radio access technology that is different than the first radio access technology used to transmit the first sidelink message, and wherein multiple transmission time intervals configured for the second radio access technology overlap with a single transmission time interval for the sidelink control channel; and transmit, on the set of time and frequency resources in a first transmission time interval of the multiple transmission time intervals, a second sidelink message associated with the second radio access technology, wherein one or more of the multiple transmission time intervals after the first transmission time interval are available for a retransmission of the second sidelink message, for other transmissions using the second radio access technology, or both.

* * * * *